US010787365B2

(12) United States Patent
Patole et al.

(10) Patent No.: US 10,787,365 B2
(45) Date of Patent: Sep. 29, 2020

(54) EXPANSION AND EXFOLIATION OF GRAPHITE TO FORM GRAPHENE

(71) Applicant: KING ABDULLAH UNIVERSITY OF SCIENCE AND TECHNOLOGY, Thuwal (SA)

(72) Inventors: Shashikant P. Patole, Thuwal (SA); Pedro M. F. J. Costa, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 144 days.

(21) Appl. No.: 15/775,203

(22) PCT Filed: Jan. 17, 2017

(86) PCT No.: PCT/IB2017/000107
§ 371 (c)(1),
(2) Date: May 10, 2018

(87) PCT Pub. No.: WO2017/125819
PCT Pub. Date: Jul. 27, 2017

(65) Prior Publication Data
US 2018/0370801 A1 Dec. 27, 2018

Related U.S. Application Data

(60) Provisional application No. 62/280,008, filed on Jan. 18, 2016.

(51) Int. Cl.
*C01B 32/19* (2017.01)
*C09D 11/00* (2014.01)
(Continued)

(52) U.S. Cl.
CPC .............. *C01B 32/19* (2017.08); *C09D 11/00* (2013.01); *H01M 4/587* (2013.01);
(Continued)

(58) Field of Classification Search
CPC ..... C01B 32/19; C01B 2204/04; C09D 11/00; H01M 10/054; H01M 4/587; B82Y 30/00; B82Y 40/00
See application file for complete search history.

(56) References Cited

U.S. PATENT DOCUMENTS

2008/0258359 A1 10/2008 Zhamu et al.
2009/0026086 A1 1/2009 Zhamu et al.
(Continued)

FOREIGN PATENT DOCUMENTS

WO 2015193267 A1 12/2015

OTHER PUBLICATIONS

Geng, Yan, Qingbin Zheng, and Jang-Kyo Kim. "Effects of stage, intercalant species and expansion technique on exfoliation of graphite intercalation compound into graphene sheets." Journal of nanoscience and nanotechnology 11.2 (2011): 1084-1091.*
(Continued)

*Primary Examiner* — Richard M Rump
(74) *Attorney, Agent, or Firm* — Patent Portfolio Builders PLLC

(57) ABSTRACT

Graphene production methods are described based on subjecting non-covalent graphite intercalated compounds, such as graphite bisulfate, to expansion conditions such as shocks of heat and/or microwaves followed by turbulence-assisted exfoliation to produce few-layer, high quality graphene flakes. Depending on the approach selected for the exfoliation step, free-flowing graphene powder, graphene slurry, or an aqueous graphene mixture can be obtained. Surfactants can aid in dispersion, and graphene inks can be formed. The parameters of the process are simple, efficient and low-cost enabling therefore the scale-up of production. Applications include electrodes and energy storage devices.

19 Claims, 17 Drawing Sheets

(51) Int. Cl.
H01M 4/587 (2010.01)
H01M 10/054 (2010.01)
B82Y 30/00 (2011.01)
B82Y 40/00 (2011.01)

(52) U.S. Cl.
CPC .......... *H01M 10/054* (2013.01); *B82Y 30/00* (2013.01); *B82Y 40/00* (2013.01); *C01B 2204/04* (2013.01)

(56) References Cited

U.S. PATENT DOCUMENTS

| | | |
|---|---|---|
| 2010/0028559 A1 | 2/2010 | Yan et al. |
| 2013/0087446 A1 | 4/2013 | Zhamu et al. |
| 2013/0136684 A1 | 5/2013 | Wu et al. |
| 2013/0171055 A1 | 7/2013 | He et al. |
| 2015/0071844 A1 | 3/2015 | Kim et al. |
| 2015/0275378 A1 | 10/2015 | Koo et al. |
| 2015/0353361 A1 | 12/2015 | Wada et al. |

OTHER PUBLICATIONS

Wei, Di, et al. "Ultrathin rechargeable all-solid-state batteries based on monolayer graphene." Journal of Materials Chemistry A 1.9 (2013): 3177-3181.*
Howe, Richard CT, et al. "Functional inks of graphene, metal dichalcogenides and black phosphorus for photonics and (opto) electronics." Low-Dimensional Materials and Devices. vol. 9553. International Society for Optics and Photonics, 2015.*
Okotrub, A. V., et al. "Nitrogen species in few-layer graphene produced by thermal exfoliation of fluorinated graphite intercalation compounds." physica status solidi (b) 252.11 (2015): 2444-2450.*
Yang, Sheng, et al. "Organic radical-assisted electrochemical exfoliation for the scalable production of high-quality graphene." Journal of the American Chemical Society 137.43 (2015): 13927-13932.*
Matsumoto, Michio, et al. "Ultrahigh-throughput exfoliation of graphite into pristine 'single-layer'graphene using microwaves and molecularly engineered ionic liquids." Nature chemistry 7.9 (2015): 730.*
Alam, Syed Nasimul, et al. "Effect of sonication on the synthesis of exfoliated graphite nanoplatelets by thermal exfoliation process." Graphene 2.2 (2014): 75-87.*
International Search Report in related International Application No. PCT/IB2017/000107, dated Apr. 21, 2017.
Written Opinion of the International Searching Authority in related International Application No. PCT/IB2017/000107, dated Apr. 21, 2017.
A.K.Geim, "Graphene: Status and Prospects", Science, Jun. 19, 2009, pp. 1530-1534, vol. 324.
A.P. Yaroshenko et al., "Synthesis and Properties of Thermally Expandable Residual Graphite Hydrosulfite Obtained in the System HNO3—H2SO4", Russian Journal of Applied Chemistry, 2002, pp. 861-865, vol. 75, No. 6.
Amaia Zurutuza et al., "Challenges and opportunities in graphene commercialization", Nature Nanotechnology, Oct. 2014, pp. 730-734, vol. 9.
Badrayyana Subramanya et al., "Novel one-pot green synthesis of graphene in aqueous medium under microwave irradiation using a regenerative catalyst and the study of its electrochemical properties", New J. Chem., 2015, pp. 420-430, vol. 39.

Christopher R. Herron et al., "Simple and scalable route for the 'bottom-up' synthesis of few-layer graphene platelets and thin films", Journal of Materials Chemistry, 2011, pp. 3378-3383, vol. 21.
Hannes C. Schniepp et al., "Functionalized Single Graphene Sheets Derived from Splitting Graphite Oxide", The Journal of Physical Chemistry B, 2006, pp. 8535-8539, vol. 110.
Hanns-Peter Boehm et al., "Nomenclature and Terminology of Graphite Intercalation Compounds", Pure & Appl. Chem., 1994, pp. 1893-1901, vol. 66, No. 9.
J.A. Baimova et al., "Review on Crumpled Graphene: Unique Mechanical Properties", Rev. Adv. Mater. Sci., 2014, pp. 69-83, vol. 39.
Jiang Long et al., "Microwave-assisted rapid synthesis of water-soluble graphene", Journal of Materials Chemistry, 2011, pp. 10421-10425, vol. 21.
Jinming Cai et al., "Atomically precise bottom-up fabrication of graphene nanoribbons", Nature, Jun. 22, 2010, pp. 470-473, vol. 466.
Jun Liu, "Charging graphene for energy", Nature Nanotechnology, Oct. 6, 2014, pp. 739-741, vol. 9, No. 10.
K.S. Novoselov et al., "Electric Field Effect in Atomically Thin Carbon Films", Science, Oct. 22, 2004, pp. 666-669, vol. 306.
Nazish Parveen et al., "Simple route for gram synthesis of less defective few layered graphene and its electrochemical performance", RSC Advances, 2015, pp. 44920-44927, vol. 5.
Nina I. Kovtyukhova et al., "Non-oxidative intercalation and exfoliation of graphite by Bronsted acids", Nature Chemistry, Nov. 2014, pp. 957-963, vol. 6.
Qingkai Yu et al., "Graphene segregated on Ni surfaces and transferred to insulators", Applied Physics Letters, 2008, pp. 113103-1 to 113103-3, vol. 93.
Sang-Hoon Park et al., "Solid-state microwave irradiation synthesis of high quality graphene nanosheets under hydrogen containing atmosphere", Journal of Materials Chemistry, 2011, pp. 680-686, vol. 21.
Sasha Stankovich et al., "Synthesis of graphene-based nanosheets via chemical reduction of exfoliated graphite oxide", Carbon, 2007, pp. 1558-1565, vol. 45.
Sukang Bae et al., "Roll-to-roll production of 30-inch graphene films for transparent electrodes", Nature Nanotechnology, Aug. 2010, pp. 574-578, vol. 5.
Toshiyuki Kobayashi et al., "Production of a 100-m-long high-quality graphene transparent conductive film by roll-to-roll chemical vapor deposition and transfer process", Applied Physics Letters, 2013, pp. 023112-1 to 023112-4, vol. 102.
V. Sridhar et al., "Synthesis of graphene nano-sheets using eco-friendly chemicals and microwave radiation", Carbon, 2010, pp. 2953-2957, vol. 48.
William S. Hummers, Jr. et al., "Preparation of Graphitic Oxide", J. Am. Chem. Soc., Mar. 20, 1958, p. 1339, vol. 80.
Xiaolin Li et al., "Highly conducting graphene sheets and Langmuir-Blodgett films", Nature Nanotechnology, Sep. 2008, pp. 538-542, vol. 3.
Xiaoxu Liu et al., "Repeated microwave-assisted exfoliation of expandable graphite for the preparation of large scale and high quality multi-layer graphene", RSC Advances, 2013, pp. 11601-11606, vol. 3.
Xuesong Li et al., "Large-Area Synthesis of High-Quality and Uniform Graphene Films on Copper Foils", Science, Jun. 5, 2009, pp. 1312-1314, vol. 324.

* cited by examiner

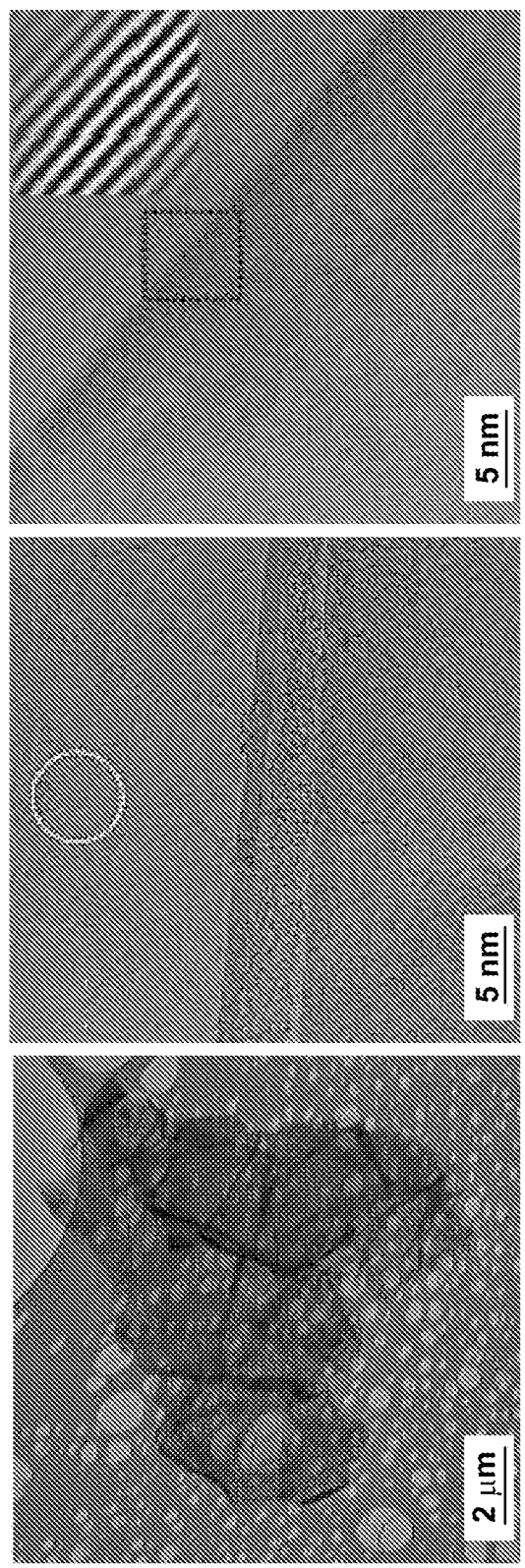

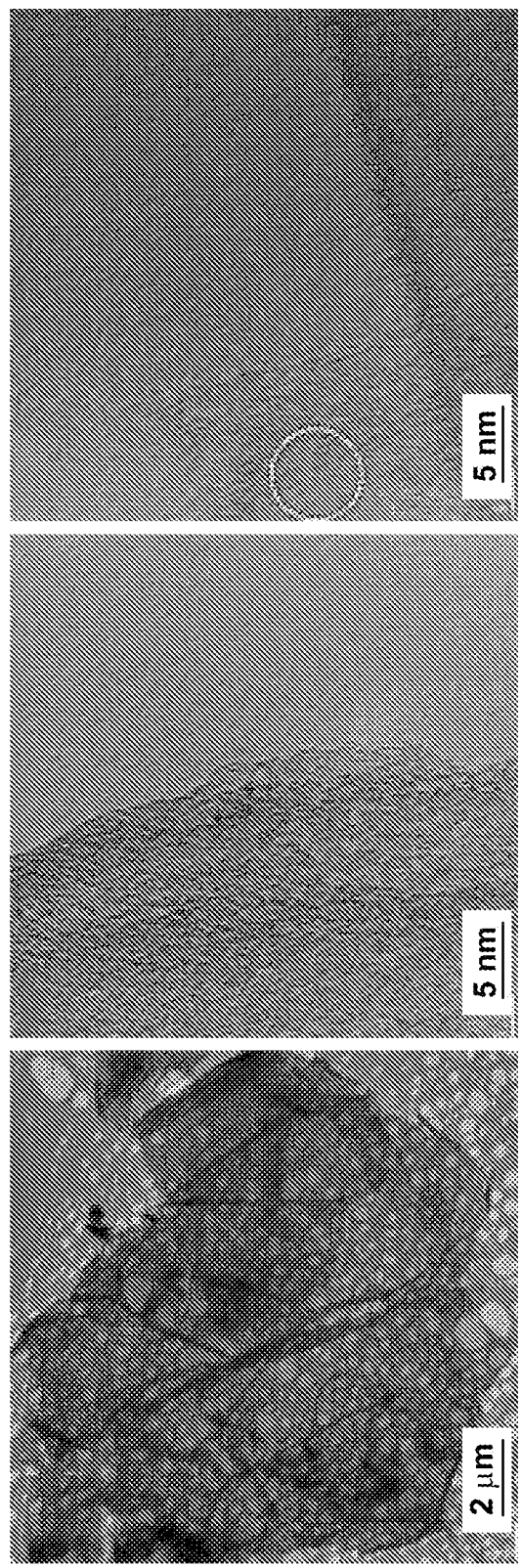

EXPANSION AND EXFOLIATION OF GRAPHITE TO FORM GRAPHENE

BACKGROUND

Graphene, which in a pure definition is a one-atom thick sheet made of carbon atoms packed as a two-dimensional honeycomb lattice, has gained extensive consideration of researchers and industry due to its extraordinary properties [Geim A K., "Graphene: Status and Prospects," *Science*. 2009; 324 (5934):1530-4]. The term "graphene," however, has also come to include materials where a small number of layers of graphene are present such as in a bilayer or trilayer of graphene (or in so-called "few layer graphene" which can have ten or fewer layers). The individual layers of graphene may randomly stack on other layers of graphene, or may stack in a more organized form as in graphite. Materials are now sold commercially which are called "graphene" or "graphene-based materials" even though they are not one-atom thick sheets made of carbon atoms (monolayers or single layers). Leading types of graphene include graphene films, graphene oxide (GO) flakes, and graphene nanoplatelets (GNPs) [Zurutuza A, et al., "Challenges and opportunities in graphene commercialization," *Nat. Nano*. 2014; 9(10):730-4].

Mass production of high quality graphene using a reliable, repeatable, ecofriendly and inexpensive approach is a prerequisite to realize its intriguing properties by industry. Until now, graphene has been prepared via various methods, generally divided into two categories: bottom-up and top-down.

The bottom-up method is based on the decomposition of a hydrocarbon gas over a suitable catalyst film to form mono- or multi-layer graphene [Bae S, et al., "Roll-to-roll production of 30-inch graphene films for transparent electrodes," *Nat Nano*. 2010; 5(8):574-8; Kobayashi T, et al. "Production of a 100-m-long high-quality graphene transparent conductive film by roll-to-roll chemical vapor deposition and transfer process," *Appl Phys Lett*. 2013; 102(2): 023112; Li X, et al. "Large-Area Synthesis of High-Quality and Uniform Graphene Films on Copper Foils," *Science*. 2009; 324(5932):1312-4; Herron C R, et al., "Simple and scalable route for the 'bottom-up' synthesis of few-layer graphene platelets and thin films," *Journal of Materials Chemistry*. 2011; 21(10):3378-83], assembling polyaromatic hydrocarbons to form graphene ribbons [Cai J, et al., "Atomically precise bottom-up fabrication of graphene nanoribbons," *Nature*. 2010; 466(7305):470-3] and surface segregation of dissolved carbon from solids [Yu Q, et al., "Graphene segregated on Ni surfaces and transferred to insulators," *Appl Phys Lett*. 2008; 93(11):113103]. The first of these can result in large sized graphene films with high crystalline quality but it has a high cost and low production rate given that it uses chemical vapor deposition (CVD) reactors.

The top-down approach consists in mechanically cleaving graphite slabs [Novoselov K S, et al., "Electric Field Effect in Atomically Thin Carbon Films," *Science*. 2004; 306 (5696):666-9] or intercalating molecules/atoms between the graphite interlayer space followed by the exfoliation of such graphite compounds using a chemical, physical, or electrochemical methods [Hummers W S, et. al., "Preparation of graphite oxide." *J. Am. Chem. Soc*. 1958; 80:1339; Kovtyukhova N I, et al., "Non-oxidative intercalation and exfoliation of graphite by Brønsted acids," *Nat. Chem*. 2014; 6(11):957-63; Parveen N, et al., "Simple route for gram synthesis of less defective few layered graphene and its electrochemical performance," *RSC Advances*. 2015; 5(56): 44920-7; Subramanya B, et al., "Novel one-pot green synthesis of graphene in aqueous medium under microwave irradiation using a regenerative catalyst and the study of its electrochemical properties," *New Journal of Chemistry*. 2015; 39(1):420-30; Stankovich S, et al. "Synthesis of graphene-based nanosheets via chemical reduction of exfoliated graphite oxide," *Carbon*. 2007; 45(7):1558-65; Park S-H, et al., "Solid-state microwave irradiation synthesis of high quality graphene nanosheets under hydrogen containing atmosphere," *Journal of Materials Chemistry*. 2011; 21(3):680-6; Long J, et al. "Microwave-assisted rapid synthesis of water-soluble graphene," *Journal of Materials Chemistry*. 2011; 21(28):10421-5; Liu X, et al., "Repeated microwave-assisted exfoliation of expandable graphite for the preparation of large scale and high quality multi-layer graphene," *RSC Advances*. 2013; 3(29):11601-6; Sridhar V, et al., "Synthesis of graphene nano-sheets using eco-friendly chemicals and microwave radiation," *Carbon*. 2010; 48(10): 2953-7; Schniepp H C, et al., "Functionalized Single Graphene Sheets Derived from Splitting Graphite Oxide," *The Journal of Physical Chemistry B*. 2006; 110(17):8535-9; Li X, et al., "Highly conducting graphene sheets and Langmuir-Blodgett films," *Nat Nano*. 2008; 3(9):538-42].

The embodiments described and/or claimed herein relate more to this top-down category.

Within the top-down approach, graphene nanoplatelets and graphene oxide synthesized by intercalation followed by solution-based (or chemical) exfoliation have received intense interest because of their scalability and low production costs. However, these methods generally involve complicated processes and require a lot of time and effort. Alternatively, the dry exfoliation of intercalated graphitic compounds induced by heat or microwave offers a swift preparation route of graphene that is furthermore simple and cost effective.

For example, Park et al. used solid state microwave irradiation to synthesize graphene sheets from a mixture of graphite oxide and graphene nanosheets under hydrogen atmosphere [Park S-H, et al., "Solid-state microwave irradiation synthesis of high quality graphene nanosheets under hydrogen containing atmosphere," *Journal of Materials Chemistry*. 2011; 21(3):680-6].

Long J. et al. used microwave radiation as a heating source for the exfoliation of graphite oxide in liquid phase [Long J, et al., "Microwave-assisted rapid synthesis of water-soluble graphene," *Journal of Materials Chemistry*. 2011; 21(28):10421-5].

Liu et al. used commercial expandable graphite for intercalating hydrogen peroxide and ammonium persulfate, and employed repeated microwave-assisted exfoliation to obtain multilayer graphene [Liu X, et al., "Repeated microwave-assisted exfoliation of expandable graphite for the preparation of large scale and high quality multi-layer graphene," *RSC Advances*. 2013; 3(29):11601-6].

Sridhar et al. used a mixture of graphite and ammonium peroxydisulfate with hydrogen peroxide to obtain graphene nanosheets using microwave radiation [Sridhar V, et al., "Synthesis of graphene nano-sheets using eco-friendly chemicals and microwave radiation," *Carbon*. 2010; 48(10): 2953-7].

Schniepp et al. reported a process to produce single sheets of epoxy-functionalized graphene through the thermal exfoliation of graphite oxide [Schniepp H C, et al., "Functionalized Single Graphene Sheets Derived from Splitting Graphite Oxide," *The Journal of Physical Chemistry B*. 2006; 110(17):8535-9].

Li et al. used expandable graphite as a starting material and exfoliated it at 1000° C. for 60 s [Li X, et al., "Highly conducting graphene sheets and Langmuir-Blodgett films," *Nat Nano.* 2008; 3(9):538-42].

While employing thermal and microwave induced exfoliation, the above described methods lack simplicity, particularly in the experimental part. Complicated procedures and/or the use of multistep reactions are unlikely to represent feasible approaches for scale up. Some of these methods are also dangerous as they can cause explosions and therefore require extra, cost-increasing precautions. In others, the intercalated compound contains oxygen species (e.g., graphene oxide), which eventually contribute to the generation of structural defects in the graphene lattice (due to this over-oxidation the product obtained is a lower quality graphene after exfoliation). Furthermore, the exfoliated graphene oxide needs an additional reduction step using, for example, hydrazine or hydrogen gas flows. The exfoliation process may not be entirely uniform and result, instead, in a mixture of few- and multi-layer graphene. That leads to further cost-increasing treatments (e.g., ultrasonication and/or centrifugation) to get the desired quality of graphene.

Overall, methods described to present are suitable for laboratory work but not applicable for mass production of graphene flakes at an industrial scale.

SUMMARY

Embodiments described herein include methods of making materials, as well as the materials themselves. Also described are the compositions which comprise the materials, including inks, and uses for the materials and/or compositions. This includes, for example, devices, apparatuses, and systems that use or comprise the materials and/or compositions.

A first aspect is, for example, a method comprising: subjecting at least one graphite intercalation compound to expansion conditions to produce graphene, wherein the particle size of the graphite intercalation compound and the expansion time of the expansion conditions are adapted to provide a high quality graphene reaction product in which the average expansion in the reaction product is at least 10,000.

A second aspect is, for example, a method comprising: subjecting at least one graphite intercalation compound to expansion conditions to produce graphene, wherein the particle size of the graphite intercalation compound and the expansion time of the expansion conditions are adapted to provide a high quality graphene reaction product in which the average separation distance between two adjacent graphene sheets in the reaction product is at least 5 microns.

A third aspect, for example, provides for a method comprising: subjecting at least one graphite intercalation compound to expansion conditions to produce graphene.

The graphite intercalation compound can be in the form of flakes. In additional embodiments, the graphite intercalation compound is in the form of flakes, and the flakes of the graphite intercalation compound are characterized by an average extension along the basal plane of a distance of at least 50 microns, or at least 100 microns, or at least 300 microns, or
at least 500 microns.

In additional embodiments, the graphite intercalation compound is expandable graphite. In additional embodiments, the graphite intercalation compound is a graphite salt. In additional embodiments, the graphite intercalation compound is intumescent graphite bisulfate. In additional embodiments, the graphite intercalation compound has a percent carbon of at least 85%, or at least 95%. In additional embodiments, the graphite intercalation compound has sulfur as the intercalated element of highest atomic percent. In additional embodiments, the graphite intercalation compound is intumescent graphite bisulfate which has a sulfur content of at least one wt. %. In additional embodiments, the graphite intercalation compound is intumescent graphite bisulfate which has a sulfur content of at least two wt. %. In additional embodiments, the graphite intercalation compound is intumescent graphite bisulfate which has a sulfur content of less than 10 wt. %. In additional embodiments, the graphite intercalation compound has an interlayer spacing larger than the graphitic interlayer spacing of 0.341.

In additional embodiments, the expansion conditions include vaporization of intercalated species. In additional embodiments, the expansion conditions include electromagnetic waves. In additional embodiments, the expansion conditions include application of microwaves. In additional embodiments, the expansion conditions include application of microwaves which have a power of about 750 W to about 1,500 W. In additional embodiments, the expansion conditions include application of a laser. In additional embodiments, the expansion conditions include application of heat which is applied without microwaves. In additional embodiments, the expansion conditions include application of heat which provides a temperature of about 950° C. to about 1,500° C. In additional embodiments, the expansion conditions include use of electric current or arc.

In additional embodiments, the time of subjecting the graphite to the expansion conditions is less than 80 seconds. In additional embodiments, the time of subjecting the graphite to the expansion conditions is greater than 20 seconds. In additional embodiments, the time of subjecting the graphite to the expansion conditions is greater than 20 seconds and less than 80 seconds.

The graphene reaction product can be in the form of flakes. In additional embodiments, the graphene is few layered graphene. In additional embodiments, the graphene is in a form to have ten or fewer graphene layers. In additional embodiments, the graphene has interlayer spacing of the graphitic layer interlayer spacing.

The graphene can be subjected to additional steps including exfoliation and ink formation. In additional embodiments, the graphene is subjected to sonication and/or mechanical shear. In additional embodiments, the graphene is subjected to sonication. In additional embodiments, the graphene is subjected to mechanical shear. In additional embodiments, the graphene is dispersed in a solvent. In additional embodiments, the graphene is dispersed in a solvent with use of a surfactant.

In additional embodiments, the solvent vehicle comprises at least 95 wt. % water. In additional embodiments, the solvent vehicle comprises at least 99 wt. % water. In additional embodiments, the solvent vehicle comprises less than 5 wt. % organic solvent. In additional embodiments, the solvent vehicle comprises less than 1 wt. % organic solvent. In additional embodiments, the ink composition comprises at least one surfactant.

The reaction products can be further subjected to exfoliation steps and/or ink formation steps.

Additional aspects include compositions and inks which are made with the methods and/or include the compositions as described and/or claimed herein. Additional embodiments include systems and devices such as, for example, an energy storage system which comprises at least one material prepared according to the methods or the compositions as described and/or claimed herein.

In preferred embodiments, presented herein is a method to produce large amounts of few layer graphene flakes (less than ten layers) in a simple two-step fashion of expansion and exfoliation. In a preferred embodiment, commercially available expandable graphite is used and expanded using either a microwave or a thermal shock treatment. Further, the expanded graphite material can be subjected to additional processing steps such as shear exfoliation using sonication and/or mechanical shearing or blending to produce graphene in varied forms such as a slurry, a free-flowing powder or an aqueous mixture.

Key points in the preferred embodiments include the development of a two-step (expansion-exfoliation) production method for high-quality graphene using low-cost conditions. The preliminary expansion step relies on the shock treatment of the starting material where: (1) the average size of the initial expanded graphite flakes is more than, for example, 300 microns; and (2) the main intercalated species are S-containing molecules which acts as microwave susceptors for the expansion process. The second exfoliation step relies on the turbulence-assisted exfoliation through the use of a blender and/or an ultrasonication device (note: this is a mechanical process, i.e. chemical reactions are absent or have negligible or secondary influence).

In this preferred embodiment, the intercalated S effectively acts as the susceptor in the microwave radiation process as follows: the shock microwave treatment injects vibrational energy to the intercalated species which is subsequently released in the form of heat; the increased thermal energy in the system eventually results in the formation of vapors, trapped within, the extended graphite flake; consequently, build-up occurs to the point that the force per unit area surpasses the van der Walls interaction forces (about 25 MPa) that keep the graphene sheets together; ultimately, the release of vapors, forming the well-known "worm"-like structures typical of expanded graphite.

Here, an innovation is the use of a short-lived thermal shock as expansion trigger—either in the form of microwaves or flash-heating—and without previous or parallel exposure to chemicals, ensuring thereby the structural integrity of the graphene layers. Consequently, our expansion approach can produce high quality graphene (e.g., Raman D/G band ratio of 0.04, oxygen/carbon atomic ratio of 0.06, conductivity of $4 \times 10^6$ S·m$^{-1}$), and highly crystalline materials (only six points in electron diffraction pattern), while retaining the initial flake size (e.g., >300 micron) and minimizing combustion of the graphite (despite being processed in normal air conditions).

Additional advantages for one or more embodiments described herein include, for example, shear exfoliation giving graphene slurry, free-flowing graphene powder and graphene aqueous. Other advantages of blending/sonication include, for at least some embodiments, low cost, fast speed, accessibility, no chemicals needed, can be scaled up, and/or retains structural integrity. In addition, various forms of graphene can be obtained including slurry form, powder form, or aqueous dispersion forms. High quality, few-layer graphene can be reliably prepared.

BRIEF DESCRIPTION OF THE FIGURES

FIG. 7(a)-(g): (A) Low magnification TEM micrograph of a ME graphene. (b-d) Selected area magnification TEM images showing number of layers and surface in ME graphene. Inset in (c) shows the filtered micrograph processed from the marked region, intensity profile along the marked line is shown in (f). (e) SAD pattern acquired over the marked region in (b). The Miller-Bravais (hkil) indices for the spots are highlighted by the circles. (g) Intensity profile along the marked arrows in (e).

FIG. 8(a)-(f): (a) Low magnification TEM micrograph of a TE graphene. (b, c) Selected area magnification TEM micrographs showing graphene edge morphology in TE graphene. (d) SAD pattern acquired near the area marked in (c). (e, f) HAADF micrograph in STEM mode, inset in (f) shows the thickness profile calculated by EELS signal along the line from the marked area.

DETAILED DESCRIPTION

Introduction

This application is a U.S. National Stage Application of International Application No. PCT/IB2017/000107, filed on Jan. 17, 2017, which claims priority and benefit from U.S.

provisional application Ser. No. 62/280,008 filed Jan. 18, 2016 the entire contents of which are hereby incorporated by reference in their entirety for all purposes.

More detailed descriptions for the various elements, aspects, and embodiments are provided hereinafter. References cited herein are incorporated herein by reference in their entirety. No admission is made that any cited reference is admitted prior art.

Embodiments described herein can be described and/or claimed using transitions such as "comprising," "consisting essentially of," or "consisting of," as known in the art.

At Least One Graphite Intercalation Compound

Figure 1:
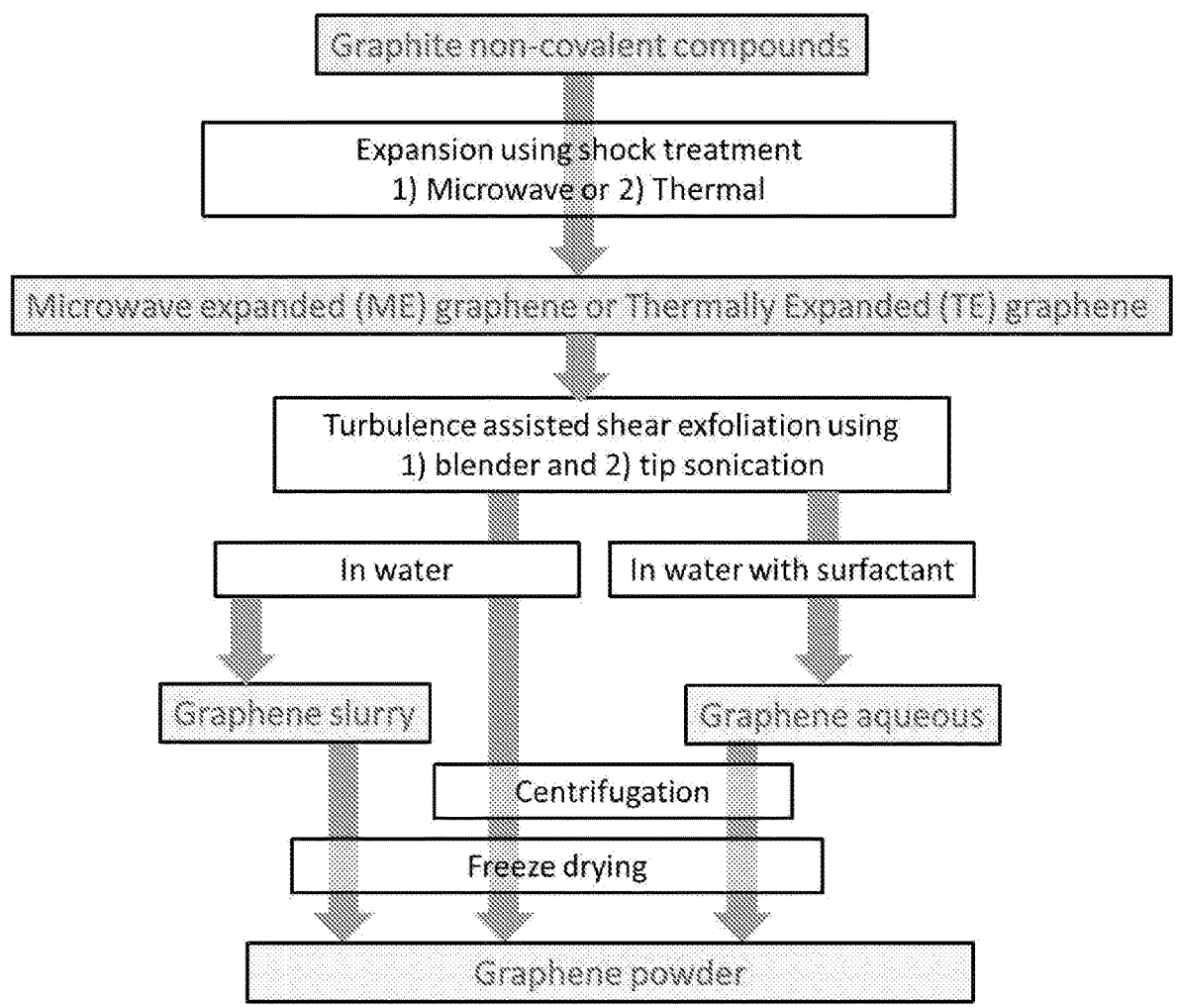
FIG. 1 illustrates exemplary process steps for expansion-exfoliation of the expandable graphite to prepare microwave expanded (ME) graphene, thermally expanded (TE) graphene, graphene slurry, graphene aqueous mixture, and graphene powder.

The at least one graphite intercalation compound can be in the form of flakes. If desired, mixtures of different types of graphite intercalation compound can be used. "Flake" or "flakes" are terms known in the art of materials science, including with respect to graphite materials. Graphite material is based on a two-dimensional graphene sheet morphology in which sheets are stacked in the third dimension (see FIG. 1, for example). The morphology of such material can be flaky or platy as viewed under SEM and polarizing light microscopy, for example. In many cases, a hexagonal morphology can be observed in at least some of the flakes. The graphite can be intercalated as known in the art.

"Graphite intercalation compound" (GIC) is a term known in the art. See, for example, the book, T. Enoki, M. Suzuki, M. Endo, *Graphite Intercalation Compounds and Applications*, 2003. See also, for example, US patent publications 2015/0275378; 2015/0071844; 2013/0171055; and 2015/0353361. The term also is discussed by the IUPAC in the article, "Nomenclature and Terminology of Graphite Intercalation Compounds," *Pure & Applied Chemistry*, Vol. 66, No. 9, pp. 1893-1901 (1994). In these graphite materials, a species is intercalated between the individual graphene sheet layers. This reference notes two distinct types of graphite materials: (1) covalent intercalation compounds in which the species is bonded via two-electron bonds to the graphene layers, or (2) non-covalent intercalation compounds, or charge transfer compounds, in which there is a charge transfer to or from the graphene layers. The non-covalent type is the type of material called "graphite intercalation compound" (GIC). Hence, non-covalent graphite intercalation compounds are also described and/or claimed herein. Covalent type materials are not within the scope of GIC. This non-covalent CIG material features reversible intercalation reactions and charge transfer interactions.

Examples of comparative covalent compounds include graphite oxide and carbon monofluoride.

Examples of non-covalent graphite intercalation compounds are known in the art and include, for example, graphite salts such as graphite nitrate, graphite bisulfate, graphite-halogens, graphite alkali-metal compounds, and graphite-metal chloride compounds.

A lead example is intumescent graphite bisulfate (IGBS) which can be prepared according to the following reactions:

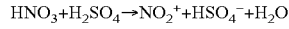
$$HNO_3 + H_2SO_4 \rightarrow NO_2^+ + HSO_4^- + H_2O$$

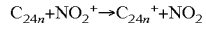
$$C_{24n} + NO_2^+ \rightarrow C_{24n}^+ + NO_2$$

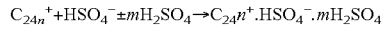
$$C_{24n}^+ + HSO_4^- \pm mH_2SO_4 \rightarrow C_{24n}^+ \cdot HSO_4^- \cdot mH_2SO_4$$

IGBS is also commonly known as expandable graphite. See, for example, Yaroshenko et al. *Russian J. Appl. Chem.*, 75, 881, 2002.

Graphite bisulfate can be obtained from Asbury Carbons, Sunbury, Pa. Different grades of graphite bisulfate are provided by suppliers including grades with different "nominal" particle sizes, particle size distribution, moisture content, sulfur content, expansion ratio, pH, and carbon content. For example, the expansion ratio can be 100-500 cc/g, or 200-400 cc/g. The pH range can be, for example, 5-10. The moisture content can be less than 1 wt. %.

The graphite intercalation compound, often in flake form, can be characterized by an average extension along the basal plane of a certain minimum distance. This minimal distance is not particularly limited as long as the advantages are achieved. In practice, the minimal distance can be, for example, at least 5 microns, or at least 10 microns, or at least 50 microns, or at least 100 microns, or at least 300 microns, or at least 500 microns. No particular upper limit is present, but examples of upper limits include, for example 1 cm, or 0.5 cm, 0.1 cm. As discussed herein, the longer distances allow for a pressure buildup which allows for an expansion and ultimate exfoliation of the graphene flakes. Particle size (both average particle size and particle size distribution) can also be used to characterize the graphite intercalation compound. Some suppliers characterize the graphite in terms of particle size. In general, larger particle sizes are preferred to achieve these longer basal plan distances. The particle size can be roughly correlated with the basal plane extension parameter.

In one embodiment, the graphite intercalation compound is expandable graphite. In one embodiment, the graphite intercalation compound is graphite salt. In one embodiment, the graphite intercalation compound is intumescent graphite bisulfate. In one embodiment, the graphite intercalation compound has a percent carbon of at least 85%, or at least 90%, or at least 95%. In all of these embodiments, the GIC can be in the form of flakes.

Various elements including sulfur can be present in the intercalation species. In one embodiment, the graphite intercalation compound has sulfur as the intercalated element of highest atomic percent. In one embodiment, the graphite intercalation compound is intumescent graphite bisulfate which has a sulfur content of at least one wt. %, or at least two wt. %. In one embodiment, the graphite intercalation compound is intumescent graphite bisulfate which has a sulfur content of less than 10 wt. %, or less than 8 wt. %. In one embodiment, the graphite intercalation compound have an interlayer spacing larger than the graphitic interlayer spacing of 0.341. Again, in all of these embodiments, the GIC can be in the form of flakes.

The working examples provided below provide additional embodiments for the graphite intercalation compound.

Expansion Conditions

The at least one graphite intercalation compound is subjected to a "shock" or "flash" treatment which provides for an "expansion trigger" in which vibration modes are activated or heat is transferred with respect to the intercalated species. One can obtain trapped species and pressure pockets with the expansion conditions. In the "shock" or "flash" expansion conditions, short, energetic conditions are used; gradually applied conditions for expansion are avoided. For example, if an oven is used to apply heat, the oven is pre-heated to minimize the time needed to cause expansion. The form of the GIC can be, for example, flakes. In general, one wants to expand homogeneously the GIC starting material. If some of the GIC is not expanded, the portion which is not expanded can be separated out from that which is expanded. One skilled in the art can adapt the expansion conditions to the industrial scale-up context including, for example, size of reaction, degree of expansion desired, and nature of the starting CIG as representative factors.

In one embodiment, the expansion conditions include vaporization of intercalated species.

In one embodiment, the expansion conditions include application of electromagnetic waves. In one embodiment, the expansion conditions include application of microwaves. The power of the microwaves is not particularly limited, but in one embodiment, the expansion conditions include application of microwaves which have a power of about 750 W to about 1,500 W. In one embodiment, the expansion conditions include a laser which can be, for example, a UV laser.

In one embodiment, the expansion conditions include application of heat. The heat can be applied without microwaves. For example, a pre-heated oven can be used to apply the heat. In one embodiment, the expansion conditions include application of heat which provides a temperature of about 950° C. to about 1,500° C., or about 950° C. to about 1,100° C.

In one embodiment, the expansion conditions include use of electric current or arc.

The time of the flash or shock treatment is made long enough to accomplish the goal(s) but not too long so that useful properties are compromised. For example, one wants generally to avoid creation of oxygen species which can happen with heat induced oxidation. One wants the process to be long enough to give a complete expansion. One skilled in the art can test for minimum and maximum times for the treatment. In one embodiment, the time of subjecting the graphite to the expansion conditions is less than 80 seconds. In another embodiment, the time of subjecting the graphite to the expansion conditions is greater than about 15 seconds, or greater than about 20 seconds, or greater than about 30 seconds, or greater than about 40 seconds. In another embodiment, the time of subjecting the graphite to the expansion conditions is greater than 15 seconds and less than 80 seconds.

The particle size of the graphite intercalation compound and the time of the expansion conditions, along with other factors in the process as appropriate, can be adapted to provide a desired result in the graphene product. For example, the average separation distance between two adjacent graphene sheets can be controlled. For example, one embodiment is a method comprising subjecting at least one graphite intercalation compound to expansion conditions to produce graphene, wherein the particle size of the graphite intercalation compound and the expansion time are adapted to provide a high quality graphene reaction product in which the average separation distance between two adjacent graphene sheets is at least 5 microns, or at least 10 microns, or at least 25 microns. No particular upper limit is present but an upper limit can be, for example 100 microns, or 50 microns.

Alternatively, an embodiment is a method comprising: subjecting at least one graphite intercalation compound to expansion conditions to produce graphene, wherein the particle size of the graphite intercalation compound and the expansion time, along with other factors in the process as appropriate, are adapted to provide a high quality graphene reaction product in which the average expansion is at least 10,000, or at least 25,000, or at least 60,000. No particular upper limit is present but an upper limit can be, for example, 250,000 or 100,000. Here, average expansion is the ratio between (1) the average separation distance between two adjacent graphene sheets in the expanded state compared to (2) the 0.34 separation distance for two adjacent graphene sheets in graphite (0.34 nm).

The working examples below provide additional embodiments for the expansion conditions.

The presently claimed inventions are not limited by theory or mechanism, but some description of the theory or mechanism is provided. The graphite intercalation compound, such as expandable graphite, can be intercalated with elements including, for example, S, Si, and Na. In microwave shock treatment, these atoms together with graphitic carbon can act as a susceptor to the microwave radiation, whereas in thermal shock treatment intercalated atoms can directly absorb the heat. Overall, microwave and/or thermal shock inject vibrational energy to the intercalated atoms. It leads to rapid thermal agitation which eventually forms the S vapors. The extended graphitic basal plane traps the S vapors resulting in build-up pressure in the adjacent graphene layers. The van der Waals interactions are responsible for holding the adjacent graphene layers by $\pi$-$\pi$ stacking. The estimated values of van der Waals interaction between the graphite layers is around 26 MPa by using Lennard-Jones potential and pairwise summation.

The maximum pressure generated by trapped vapors of S can be estimated by using the spacing of the layers from TEM measurements, the mass of vapors generated from TGA, and assuming an isochoric heating process and can be estimated to be in excess of 300 MPa. Additionally, the long extent of the basal plane in graphite (e.g., more than 300 micron) builds up excessive vapor pressure. As a result, vapors push the adjacent graphene layers apart and exfoliate graphite effectively. In this scenario, it is easy for graphene layers to overcome the van der Waals interaction. The extended basal plane allows the expansion along c-axis. As a result of the expansion, the small amount of starting expandable graphite is converted into the large volume of puffed material which occupies the available space inside the quartz crucible (e.g., see FIG. 2).

Graphene Product of Expansion

An initial, primary product of expansion is formed, and this product can be further processed as described more below. The expansion creates a primary graphene product which can be flakes of graphene. Any non-expanded material can be removed. The graphene product is high quality graphene based on measurements such as XRD, TEM, Raman, elemental analysis, conductivity, and the like. In one embodiment, the graphene can be in the form of flakes. The graphene can be few layered graphene (FLG). In one embodiment, the graphene can have ten or fewer graphene layers. In one embodiment, the graphene flakes can have interlayer spacing of the graphitic layer interlayer spacing.

The graphene produce can include "crumpled" graphene. See, for example, Baimova et. al., *Rev. Adv. Mater. Sci.,* 39 (2014), 69-83.

High crystallinity in the graphene product suggests low defects in the graphene lattice. The defects are mainly due to covalent functionalization or missing atom vacancies in graphene lattice which disorders the $SP^2$ hybridized honeycomb lattice. XRD, TEM and Raman data revealed the crystallinity. For instance if D peak in Raman spectra is high, the material is low in crystalline nature. The ring shaped SAD pattern in TEM reveals amorphous nature.

In graphene, oxygen content is an important parameter to show the quality of material. Oxygen should not covalently bond with carbon lattice ($sp^3$ hybridized). In the present case, the presence of oxygen is not generally due to the covalent functionalization, but rather it is due to the surface adsorbed or trapped oxygen species (this is supported by Raman, TEM and XRD results). The oxygen content can be, for example, less than 9 atomic percent. This oxygen can be from surface absorbed or trapped oxygen species and not from the oxygen containing functionalities.

The working examples below provide more embodiments for the graphene product and further processing of the primary graphene product.

Further Processing

The graphene product can be further treated with additional processing steps such as, for example, isolation, purification, mixing with surfactants, mixing with a solvent vehicle, and/or exfoliation.

In one embodiment, the graphene flakes are subjected to sonication and/or mechanical shear.

In one embodiment, the graphene flakes are subjected to sonication. The time for sonication can be, for example, 12 hours to 60 hours, or 15 hours to 45 hours. The sonication time might be longer than the time needed when a blender is used. For example, the time for blending can be, for example, only 2-3 hours. The blender also can provide a high yield graphene slurry.

In one embodiment, the graphene flakes are subjected to mechanical shear.

In one embodiment, the graphene flakes are dispersed in a solvent or a solvent vehicle or solvent system. This can be an ink composition. The ink composition can be adapted for a particular application. The solvent can disperse the graphene, at least temporarily, irrespective of whether a true solution is formed. The solvent can include one or more solvents. The solvent can be an aqueous system or a system in which at least 50 wt. % of the solvent is water. An organic solvent can also be used including solvents miscible with water such as an alcohol like methanol or ethanol.

In one embodiment, the graphene flakes are dispersed in a solvent with use of a surfactant. A variety of surfactants or detergents can be used including neutral, anionic, or cationic surfactants. Examples of anionic surfactants include sodium lauryl ether sulfate (SLES), sodium laureth sulfate, or carboxylate types such as sodium stearate, perfluorononanoate, perfluorooctanoate, and the like. Cationic surfactants include, for example, dioctadecyldimethylammonium bromide (DODAB), cetyl trimethylammonium chloride (CTAC), cetyl trimethylammonium bromide (CTAB), and the like.

Other embodiments are a composition prepared by any of the methods described and/or claimed herein.

Other embodiments include an ink composition prepared from graphene flakes prepared by any of the methods or with use of any of the compositions described and/or claimed herein.

The ink can include a solution or a dispersion of the solids. The percent by weight solids in the ink can be adapted for the need. It can be, for example, 0.1 wt. % to 10 wt. % percent solids.

Additional Embodiments and Applications

Another embodiment is the use of the materials described in the present invention for the purposes of, for example:

(1) fabrication of membranes; substrates for membranes include, for example, anodized aluminum oxide (MO), polysulfone, polycarbonates, polyimide, polystyrene, and the like;

(2) Transparent conducting films using filtration wet transfer method, spray coating, or deep coating, and the like. Substrates for transfer include, for example, glass, polyethylene terephthalate (PET), polyethylene naphthalate (PEN), and the like;

(3) Inks and coatings;
(4) An additive to polymers, graphene-based composites;
(5) thermally conductive compounds;
(6) electromagnetic interference shielding and antistatic films, and the like;
(7) battery electrodes, thin film batteries, and the like.

Another embodiment is the synthesis of conducting flexible polymer composite (e.g., graphene-PDMS composite). Examples of polymers include, for example, siloxanes such as polydimethylsiloxane, PDMS.

Graphene products and flakes as provided herein can be used in a variety of other applications and industries including, for example:

Large volume dispersion in paints, coatings, composites, films, adhesives, lubricants and functional fluids;

Anticorrosion coatings: "graphene flakes"-enabled anticorrosion coatings can provide a replacement for the carcinogenic chromate-based primers in steel and aluminum materials;

Polymer composite industry: in targeting composite products with lightweight, electrical/thermal conducting, flexible, mechanically robust, and the like, properties;

Metal composite industry: in targeting alloys with better electrical/mechanical/thermal properties;

Electronic industry: in searching for thermally conductive platforms for heat dissipation technology, electromagnetic shielding (EMI) materials for advanced electronic applications, wearable electronic devices, flexible electrical appliances, and the like;

Automobile industry: for lightweight automobile parts, functional coatings of various body parts, and the like;

Aircraft industry: for lightweight aircraft parts, by replacing metal frames with composite materials where graphene flakes will be used as the main filler;

Biomedical field: in various biocompatible applications including scaffolds for cellular growth, integration in dental implants and hip-replacement joints, targeted drug delivery, hyperthermia cancer treatment, and the like;

Energy industry: for battery and solar cell components such as anode and cathode materials with high capacitance, organic solar cells, flexible photovoltaics, gas storage ($H_2$, $CH_4$), and the like;

Catalysis: graphene flakes may be used as substrates;

Membranes: for contaminated water treatment, gas/fluid separation and water desalination;

Lubricant: can be used as a dry, thin-film lubricant in low-wear and high-precision components such as ball bearings, watch mechanisms, sealed mechanical systems and engine components optimized for harsh environments.

The graphene flakes can be used in solid form or in a form with a solvent in an ink form. Examples of solvents include water and/or one or more organic solvents.

WORKING EXAMPLES

Additional embodiments are provided in the following, non-limiting working examples.

Materials:

IGBS is commercially available in the market with different pH ranges, S content, moisture content, and expansion ratio. As an example, an expandable graphite grade 3372 was used with nominal size more than 300 μm, received from Asbury Carbons, Asbury, N.J., US.

For purpose of comparison, commercial graphene (as graphene nanoplatelets, CAS No. 1034343-98-0) was purchased from STREM Chemicals, Newburyport Mass., US.

For purpose of comparison, graphite (with +100 mesh size, CAS No. 7782-42-5) and ethanol were purchased from Sigma Aldrich (US).

Physical Characterizations:

Samples morphology was observed using scanning electron microscope (SEM; FEI Nova Nano 630 and Quanta 200) and transmission electron microscope (TEM, FEI Titan G2 80-300 ST). Elemental composition was analyzed using surfaces energy dispersive X-ray spectroscopy (EDS) by EDAX detector attached to the SEM and TEM. For SEM observations, powder samples were attached to an aluminum stub using double sided carbon tape. For TEM observations, a small amount of samples was dispersed in ethanol with the help of tip sonication (750 watt, 60% amplitude, 2/1 s on/off ratio pulse, total time 15-20 min). The well dispersed liquid suspension was then drop coated onto the TEM grid (holey carbon on copper grid with 300 mesh from Electron Microscopy Sciences) and used for further analysis. High-angle annular dark-field (HAADF) imaging was performed in scanning TEM (STEM) modes at a dose of 187 e A°-2. The HAADF STEM micrographs were recorded with an analog detector (E. A. Fischione, Inc.). Electron energy loss spectroscopy (EELS) was performed in STEM mode to know the extension of graphene. The entire image acquisition as well as processing of the data was accomplished by using the GMS v1.8.3 microscopy suite software (Gatan, Inc.) For Raman analysis, powdered samples were squeezed in between two glass slides. It gives attachment of samples onto the glass slides. These samples were analyzed by Raman spectrometer (Horiba Aramis) with excitation wavelength 473 nm. Thermal analysis of samples was performed using thermogravimetric analyzer (TGA; Netzsch TG 209 F1 Iris) from 25 to 1000° C. at the heating rate 10° C. per minute in dry air atmosphere (around 21% oxygen) with flow rate of 25 sccm (sccm: standard cubic centimeters per minute). Crystallographic analysis of samples was performed using powder X-ray diffractometer (XRD; Bruker D8 Advance) with Cu Kα (1.5418 Å) radiation. The instrument was operated at 40 kV voltage and 40 mA current. Powder samples were pressed onto the zero background substrate (100 Si wafer) and analyzed from 10 to 60 2θ degrees with 0.01 increments and 0.1 s/step scan speed. Electrical measurements were carried out on a single graphene flake drop casted onto a pre-patterned gold electrodes (pad size 50 μm×50 μm with 30 μm spacing) over $SiO_2$ (300 nm)/Si substrate. Electrical contacts were defined by Pt electrodes (width 200 nm, height 1 μm) by electron bean induced deposition in dual-beam SEM (FEI Helios 400S). Samples were annealed at 300° C. for 60 min at 10 mBar using BÜCHI Glass Oven B-585. Two probe electrical measurements were carried out on Janis ST-500 Cryogenic Probe Station using Keithley Source Meter 2602B.

Example 1: Thermal Shock Treatment

Around 250 mg IGBS was weighted using analytical balance and placed in a 250 ml quartz crucible. The quartz crucible was covered with a lid to avoid any fluffing of material after expansion. A muffle furnace (Nobertherm, Germany) was preheated to 1000° C. inside a fume hood. A quartz crucible was placed inside the preheated muffle furnace using a long tong with adequate precautions. The muffle furnace was closed and temperature was stabilized at 1000° C. within few seconds. Further, samples were heated for around 30 s. After this thermal shock, muffle furnace was opened and quartz crucible was removed with the long tong. A thick ceramic slab was used to place the hot crucible for cooling. After 10 min of cooling, the lid was removed and expanded material was collected for further experimentation.

Example 2: Microwave Shock Treatment

A digital microwave oven with 900 W power (Emjoi UEMO-6025DMF) was used for the microwave shock treatment. The microwave oven was kept inside a well ventilated fume hood to get rid of liberated toxic gases from graphite disulfate during the microwave shock treatment. Around 250 mg IGBS as in Example 1 was weighted using analytical balance and placed in a 250 ml quartz crucible. The quartz crucible was covered with the lid to avoid any fluffing of material after expansion. Microwave oven power was set to 100% and exposure time was set to 30 s. After microwave shock treatment, the quartz crucible was cooled down to room temperature and the puffed samples were collected for further experimentation Further Description of Examples 1 and 2

Figure 2:
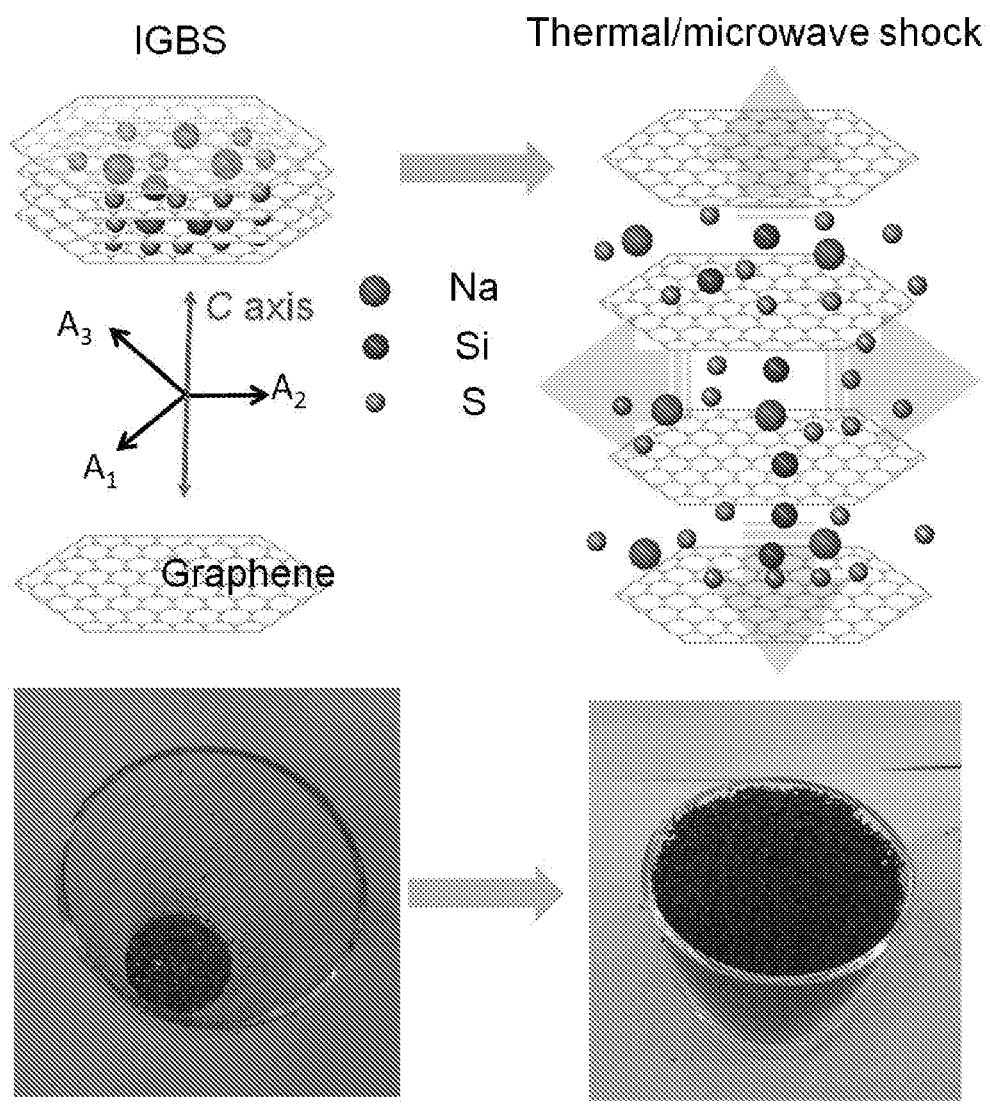
FIG. 2 shows ME/TE graphene formation from the expansion of expandable graphite by thermal/microwave shock. The upper drawing illustrates the conversion of IGBS with thermal/microwave shock. The bottom photographs show the expandable graphite before and after thermal shock (TE graphene).

FIG. 2 (top) illustrates schematically the method of making graphene materials by thermal or microwave shock. The term "shock" relates to a relatively fast reaction. FIG. 2 (bottom) shows the expandable graphite before and after thermal shock.

Figure 3:
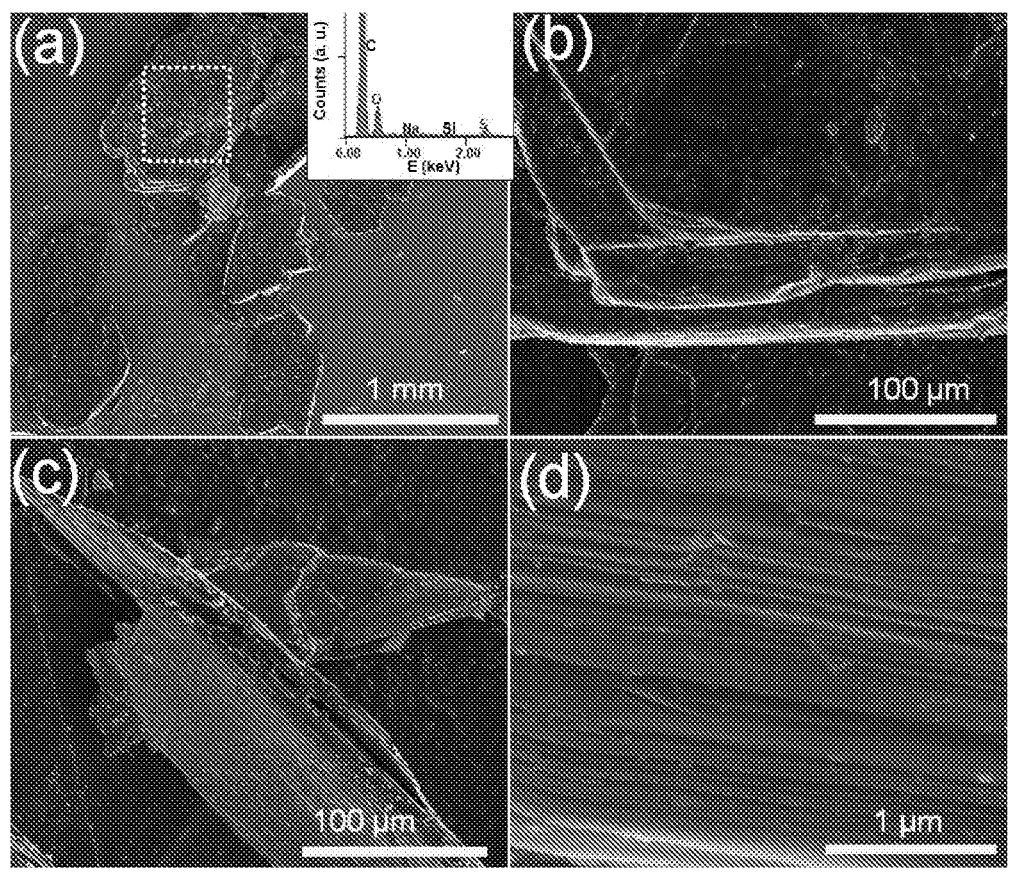
FIGS. 3(a)-(d): (a) shows SEM images of expandable graphite (EG). Inset in (a) shows the EDX spectrum acquired over the marked area. (b-d) shows single EG flake. Scale bars are provided for each micrograph.

FIG. 3 shows SEM images of as received IGBS. The individual flakes are more than 300 μm wide and up to 30 μm thick. The large extension of basal planes and stacked graphitic layers are clearly visible in the images (FIGS. 3b-3d). The elemental analysis by EDS on the selected area (inset of FIG. 3a) shows presence of C, O, Na, Si and S with 83.66, 12.73, 0.25, 0.35, 3.01 wt % respectively. The oxygen to carbon atomic % ratio for IGBS is around 0.115.

Figure 4:
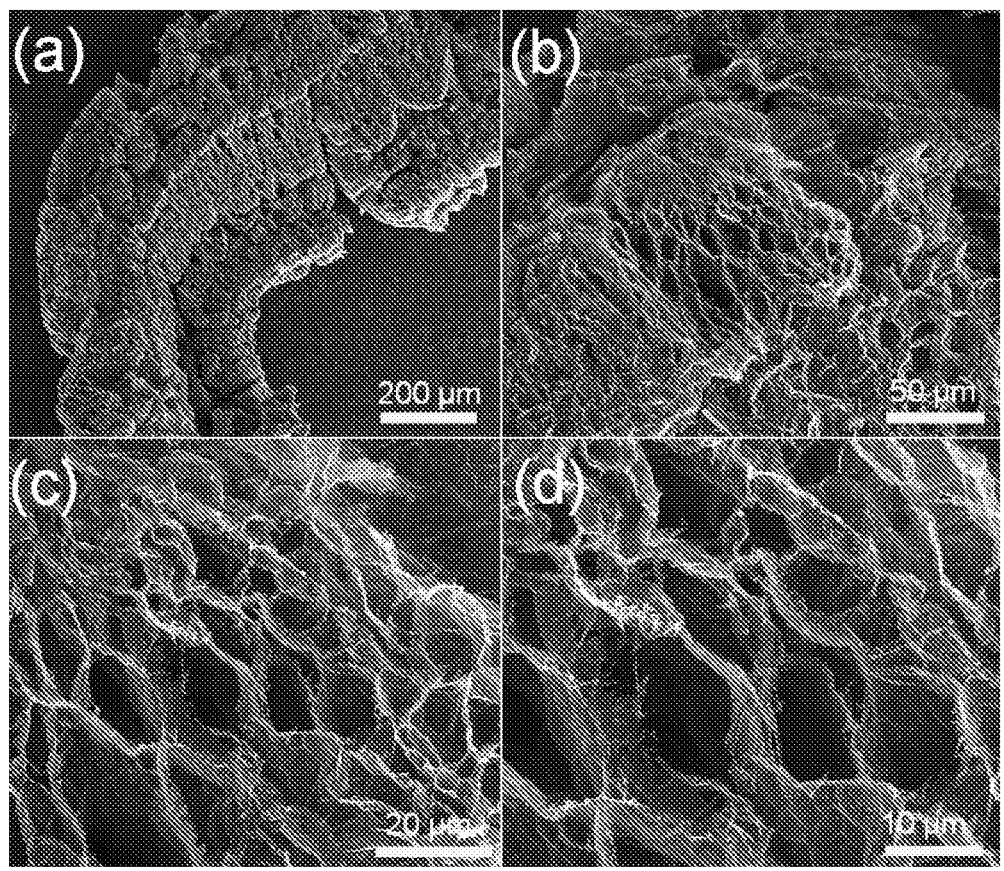
FIGS. 4(a)-(d): SEM images of (a) single EG flake after microwave shock, (b-d) 3-D network of ME graphene. Scale bars are provided for each micrograph.
Figure 5:
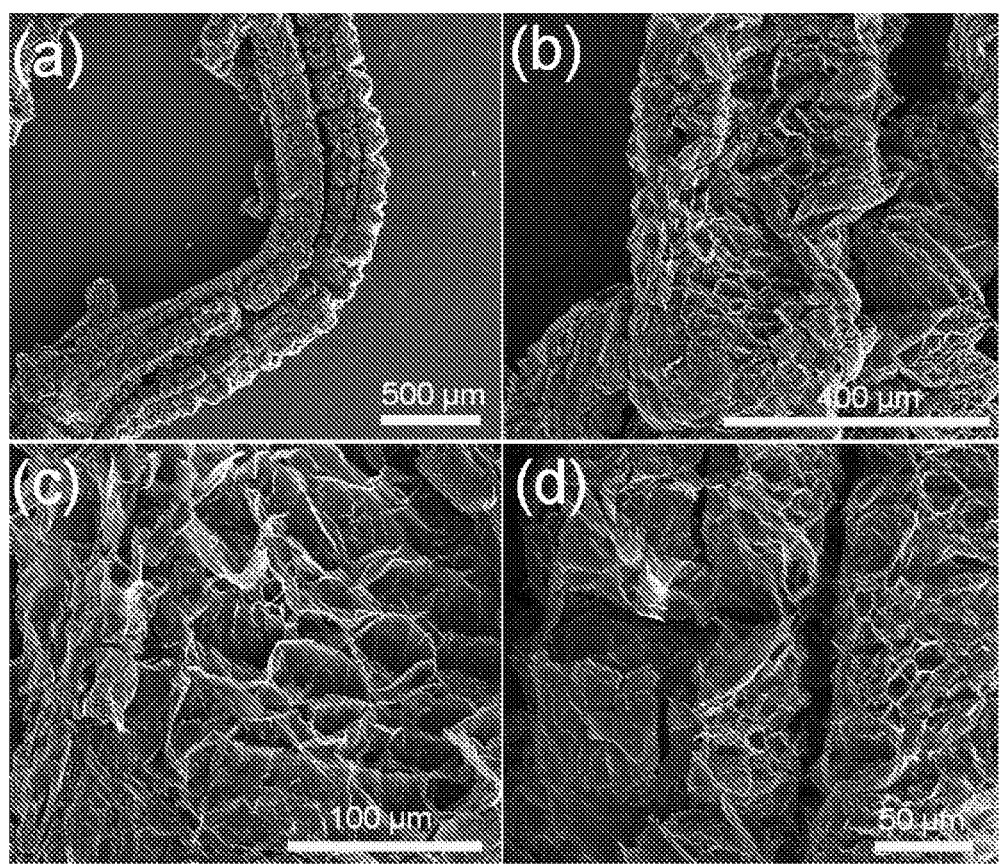
FIG. 5(a)-(d): SEM images of (a) single EG flake after thermal shock, (b-d) 3-D network of TE graphene. Scale bars are provided for each micrograph.

FIG. 4 shows SEM images of single IGBS flake after microwave expansion (ME graphene). The large expansion along c-axis is clearly visible in FIG. 4a. It is clearly evident that due to pressure exerted by the vapors of intercalate atoms onto the adjacent graphene layers, the graphene layers are exfoliated (FIG. 4b-d). At certain points two graphene sheets are attached and form a wavy origami-like 3D graphene structure. As discussed in a previous section, microwave energy agitates the intercalate atoms forming a gas which inflates the graphitic layers. The evolved gases tried to escape from the graphitic trap exerting pressure onto the adjacent graphene planes. The exerted pressure seems to be higher than the van der Waals forces resulting in the exfoliation of individual graphene sheets. The evolved gases might have inflated the graphene trap before escape leaving behind pockets in the adjacent graphene sheets. The average separation distance between two graphene sheets is observed around 10 μm. The average expansion of about 25,000 is calculated considering the average separation distance between two adjacent graphene sheets in graphite as 0.34 nm. In previous studies the expansion ratio up to 24 is reported for the IGBS. It is also observed that the use of excess amount of starting IGBS does not exfoliate all the flakes within 30 s. It requires further microwave treatment until the observed spark completely disappears during the microwave shock. The uniformity of microwave radiation within the chamber is one of the crucial parameters for the uniform exfoliation of IGBS. Nonetheless, the un-exfoliated IGBS can be removed from the remaining fluffy graphene flakes by simple winnowing. The EDS analysis shows (spectra is not shown) oxygen to carbon atomic % ratio of 0.065, indicating low oxygen content in ME graphene. It appears that a rapid increase in the temperature due to microwave selectively vaporizes the S without oxidizing graphene.

FIG. 5A-D shows SEM images of single IGBS flake after thermal shock treatment (TE graphene). The overall morphology of TE graphene is similar to ME graphene comprising the wavy origami like 3D graphene structure. The average separation distance between two adjacent graphene sheets is around 25 μm indicating the average expansion of 60,000. A rapid change in the temperature due to thermal shock (1,000° C./s) is effective to vaporize the intercalated S atoms instantly. The rapid inflation of IGBS exfoliates the graphene effectively. The EDS shows (spectra not shown) oxygen to carbon atomic % ratio of 0.062 indicating lowest amount of oxygen compare to IGBS and to ME graphene. It clearly indicates that the short and rapid thermal shock does not oxidize the graphene. It is worthwhile to note that prolonged thermal shock, i.e. more than 1 min, could oxidize the graphene. Moreover the opening of crucibles above 800° C. may expose the hot graphene to the ambient oxygen resulting in the oxidation. A smoke and ash formation could be observed for such cases.

Overall microwave shock and thermal shock are capable to exfoliate the graphene from IGBS without its oxidation. The advantages of microwave shock over thermal shock include; (a) microwave shock is very quick, it requires only, for example, 30 s, (b) it does not require the preheating of the furnace, and (c) it consumes less energy which is the electricity (220 V, 8 A) consumed during the run of microwave oven than thermal shock (energy for thermal shock is the consumption of electricity (220 V, 16 A) during preheating and maintaining the temperature at 1000° C. during the heating experiment). On the other hand, the advantages of thermal shock over microwave shock include: (a) thermal shock gives uniform exfoliation of IGBS irrespective to the amount of starting material due to the homogeneity of heat inside the furnace, (b) the average expansion ratio of IGBS is higher in thermal shock than microwave shock.

TABLE 1

| Element | IGBS Weight Ratio | IGBS Atomic Ratio | ME graphene Weight Ratio | ME graphene Atomic Ratio | TE graphene Weight Ratio | TE graphene Atomic Ratio |
| --- | --- | --- | --- | --- | --- | --- |
| C | 1 | 1 | 1 | 1 | 1 | 1 |
| O | 0.152 | 0.115 | 0.086 | 0.065 | 0.083 | 0.062 |

Table 1 provides data for the amount of oxygen present in the IGBS, the ME graphene, and the TE graphene materials relative to the amount of carbon. The relative amount of oxygen decreases with the shock treatment. The data mean that a rapid increase in the temperature due to microwave/thermal shock selectively vaporizes the S without oxidizing graphene.

Figure 6:
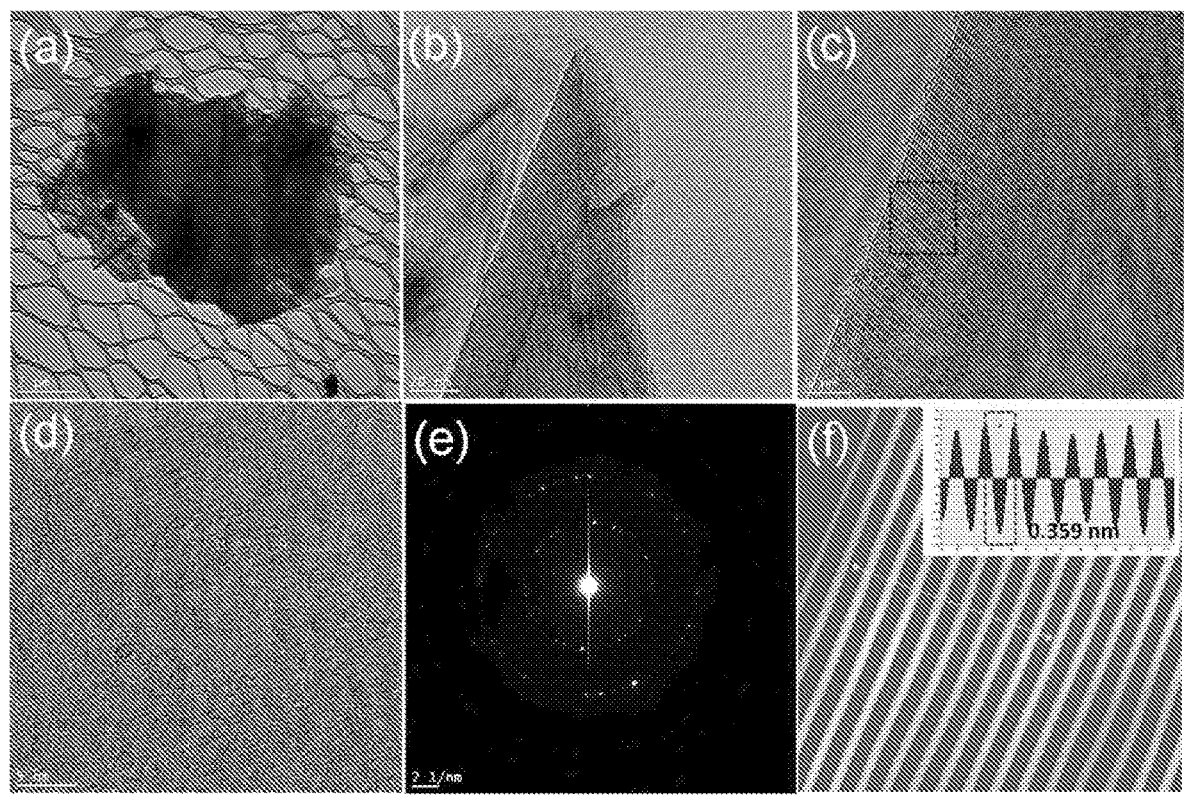
FIG. 6(a)-(f): (a) Low magnification TEM micrograph of a thin EG flake. Selected area magnification TEM micrographs of (b) folding, (c) edge, and (d) the top surface. (e) Normal incident SAD pattern acquired over the micrographs in (d). (f) Filtered image processed from the region marked in (c), inset image shows intensity profile along the marked line.
Figure 7D:
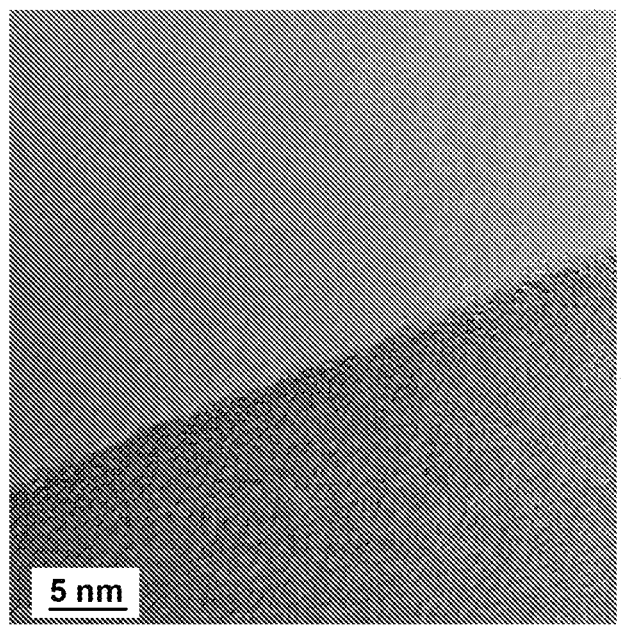
Figure 7E:
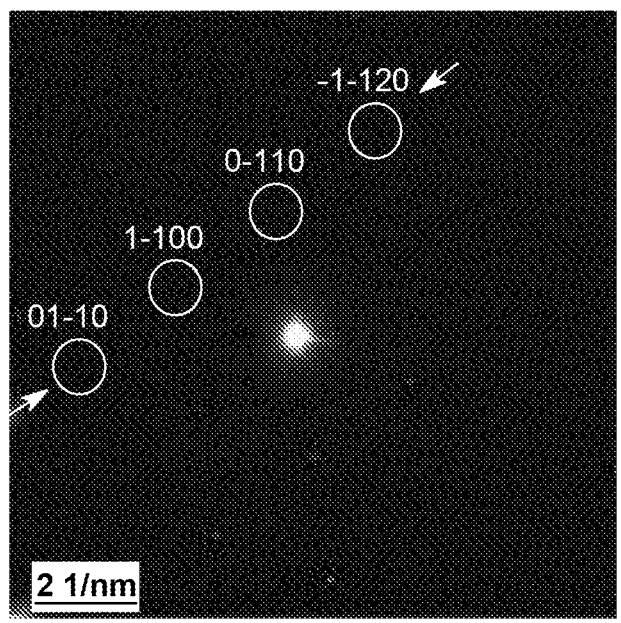
Figure 7F:
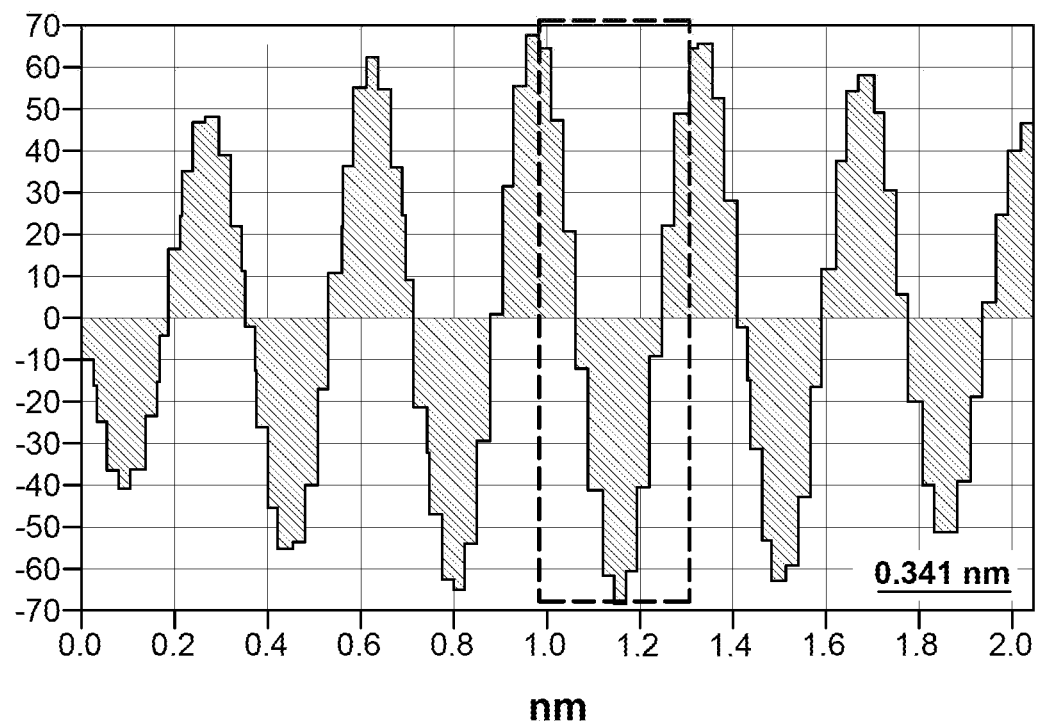
Figure 7G:
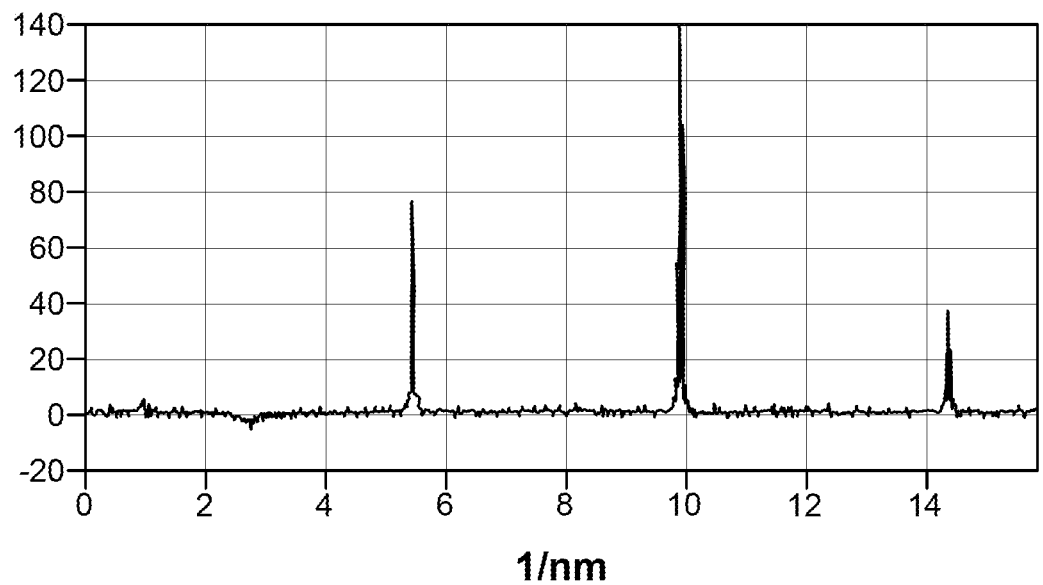

For FIG. 6, a small amount of IGBS was dispersed in ethanol using tip sonication and drop coated onto the Cu grid for TEM observations. FIG. 6 shows TEM characterizations of IGBS. A small IGBS flake with size less than 10 micron is shown in FIG. 6a. Comparatively thinner graphite unfolded edge was selected for the TEM observations as shown in FIG. 6b. A thick stack of graphene sheets is clearly observed in high resolution TEM (FIG. 6c). A clean and crystalline surface of graphite is also observed in HR-TEM as shown in FIG. 6(d). SAD pattern in FIG. 6e shows highly crystalline graphite flake consisting of graphene sheets stacked at various orientation making the ring structure of bright spots. FIG. 6f shows the filtered micrograph from the marked region in FIG. 6c. Initially, a masked micrograph was acquired by applying a mask on the Fast-Fourier-Transformed (FFT) image. The masked image was then used to generate filtered micrograph by inverse FFT. In the final filtered micrograph, the interlayer spacing is observed around 0.359 nm (inset FIG. 6c) which is higher than the graphite interlayer spacing 0.34 nm. In IGBS, the intercalate atoms mainly expand the adjacent graphene planes resulting in the higher interlayer spacing.

FIG. 7 shows TEM micrographs of ME graphene. A typical ME graphene chunk with size less than 10 micron is shown in FIG. 7a. It should be noted that the observed chunk is consisting of various individual graphene flakes in a crumpled form. In a crumpled graphene, the folding mainly contributes to the dark contrast. Compared to IGBS, the thinner flakes permit the electron beam to pass through it making much brighter image. Near the flake edges scrolls and few layers of graphene (less than 10 layers) could be identified. A typical 6, 8 and 3 layer graphene are shown in FIGS. 7b-d. Normal incident SAD pattern from the open area in FIG. 7b is shown in FIG. 7e. It shows sixfold symmetry with relatively intense inner spots along the arrows (FIG. 7g) indicating highly crystalline single layer graphene lying at a tilt with the incident beam. FIG. 7f shows the intensity profile of filtered micrograph (inset FIG. 7c). The filtered micrograph is acquired from the marked region in FIG. 7c. The interlayer spacing is observed around 0.34 nm which is equal to the graphite interlayer spacing 0.34 nm indicating the removal of intercalate atoms after microwave shock.

Figure 8D:
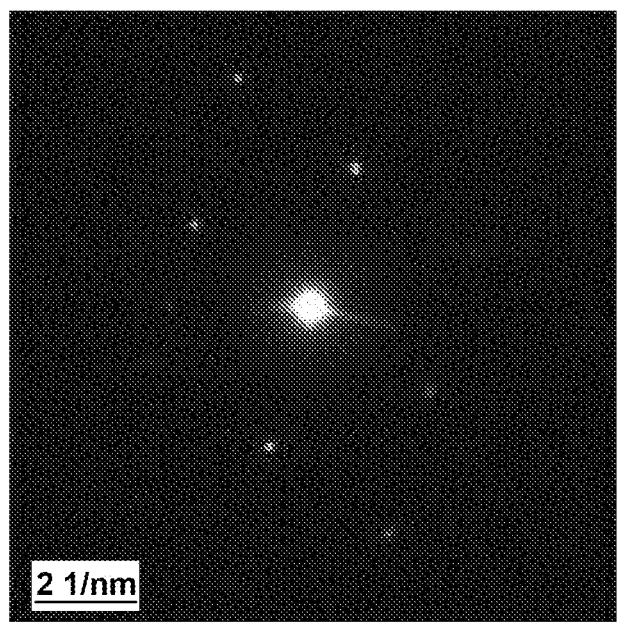
Figure 8E:
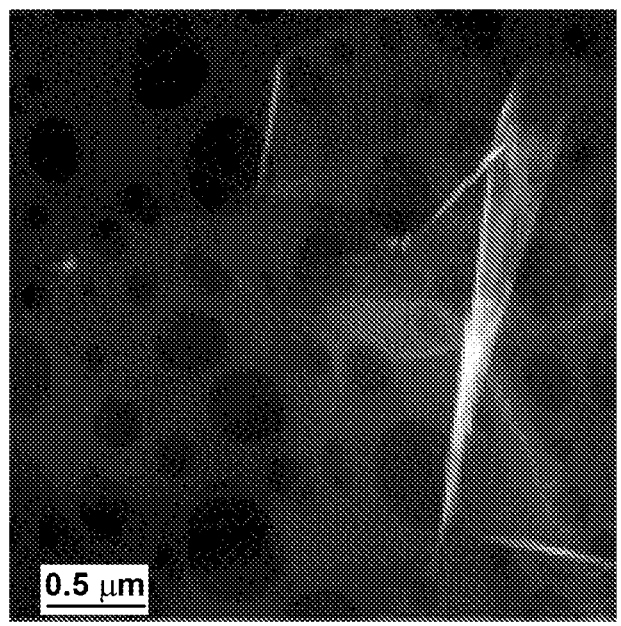
Figure 8F:
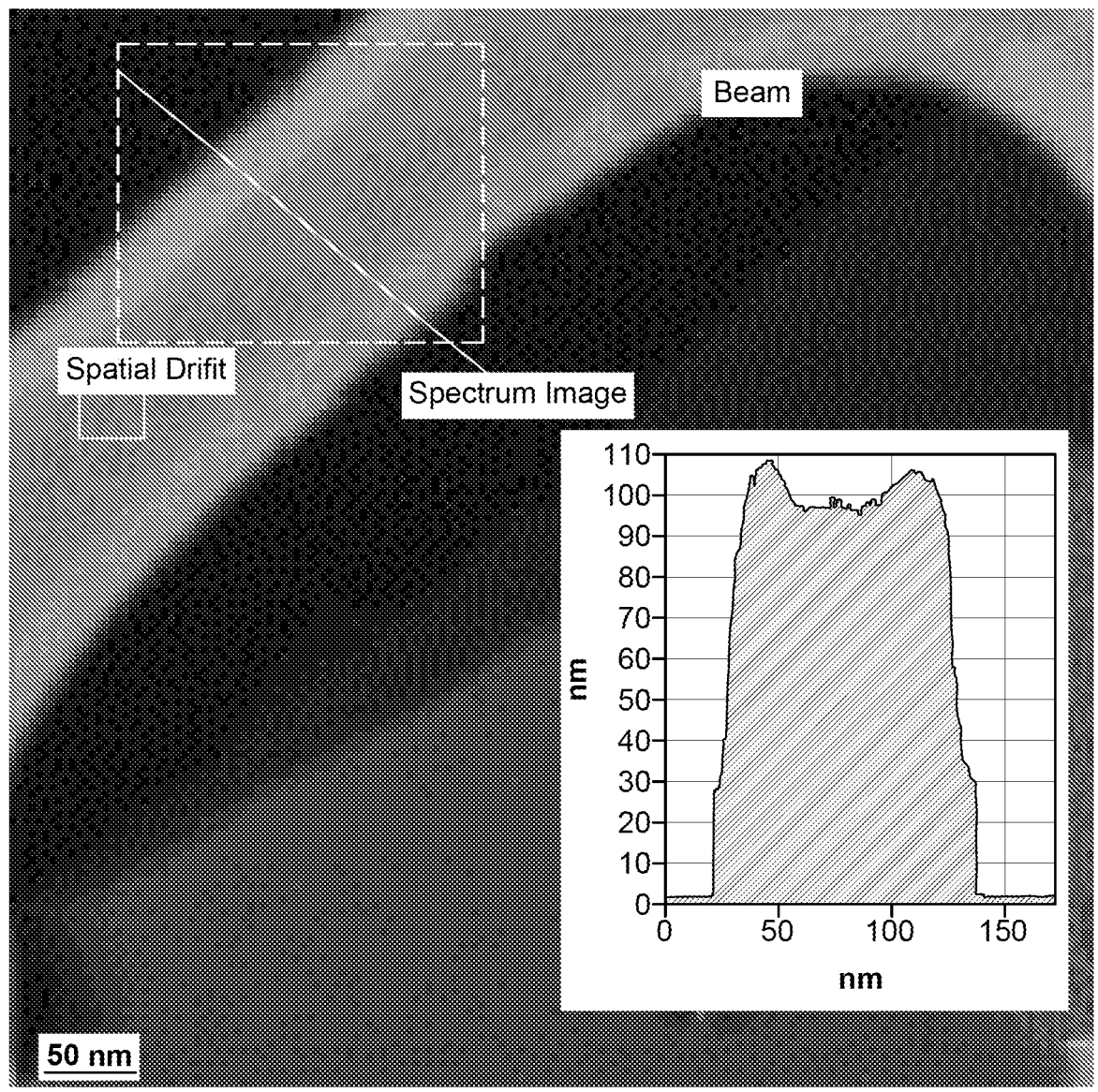

A typical TE graphene chunk with extension less than 20 μm is shown in FIG. 8a. Similar to ME graphene, folding and scrolled edges are clearly observed in a low magnification micrograph indicating crumpled graphene. In contrast to ME graphene, TE graphene (FIG. 8b-c) does not show sharp edges implying single layer graphene as bright edges without dark lines are the characteristic of single layer graphene. The undefined edges in TE graphene could be due to the homogeneous heating in thermal shock that might be responsible for unwanted oxidation at the graphene edges. In contrast, a localized heating in microwave shock protects the graphene edges from unwanted oxidation. Nonetheless it was observed that overall TE graphene also consist of less than 10 layers. Despite of the blurred edges the large basal plane is unaffected by the oxygen attack and preserve its crystallinity as revealed from the six fold symmetric SAD pattern (FIG. 8d). The inner brighter spots with blurred intensity confirm a tiled single layer graphene with the incident electron beam. The extension of graphene basal planes and their folding could be reveled in STEM HADDF images. A crumpled graphene lying over holy carbon film clearly shows the large extension of graphene basal plane. This imaging mode is also very sensitive to the surface adsorbates and the homogeneous appearance indicates a good purity of graphene. We also performed EELS analysis near the edges of large graphene films. The EELS signal was used to calculate thickness of graphene sheets along the marked line in FIG. 8f. As shown in the inset of FIG. 8f, holy carbon film shows thickness around 100 nm, whereas the over lying graphene sheet shows thickness of less than 2 nm which implies the graphene with less than 2 layers.

Figure 9:
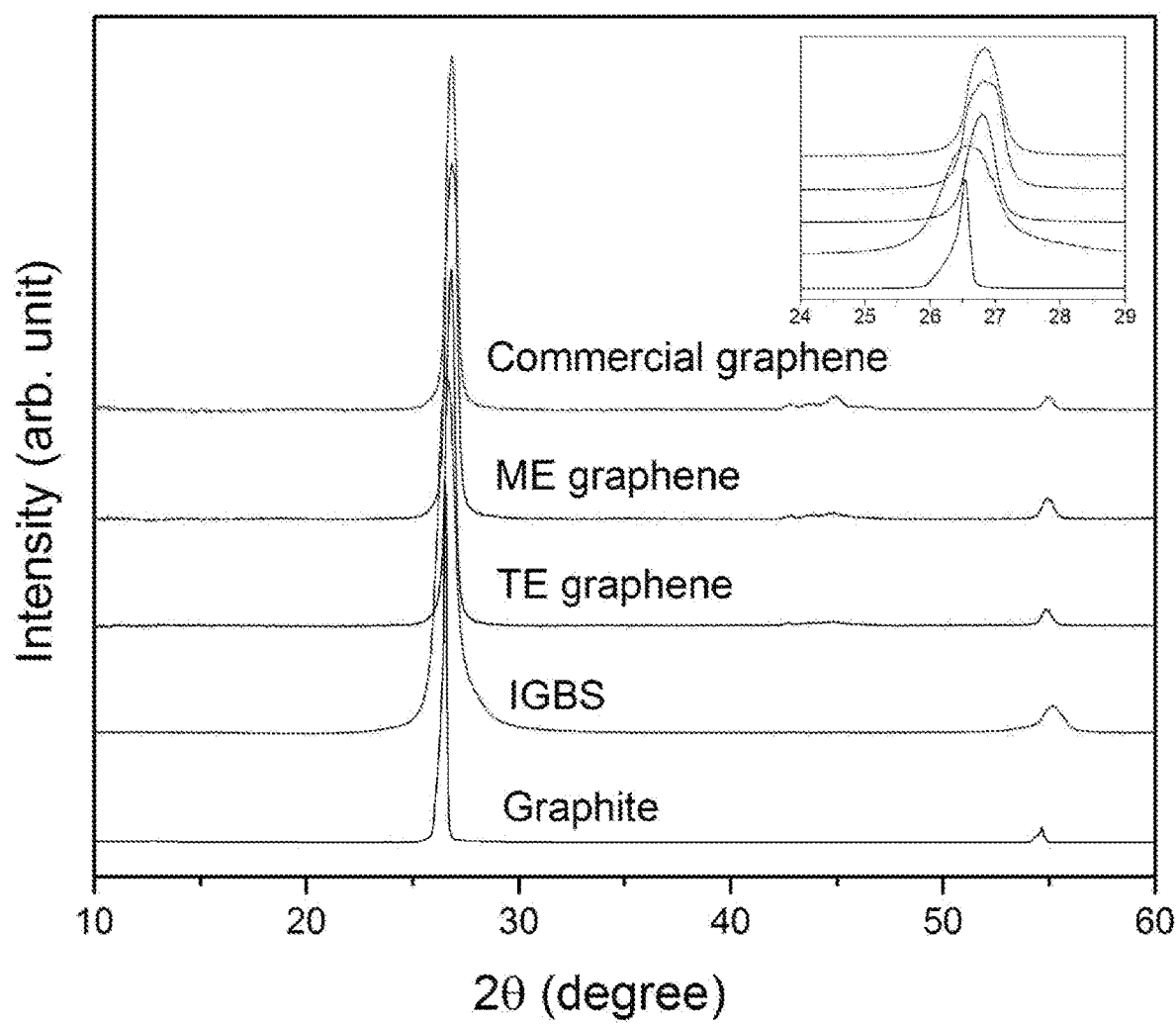
FIG. 9 shows XRD pattern of graphite, IGBS, TE graphene, ME graphene, and commercial graphene; inset shows magnified peaks in the 24-29 degree range.

Normalized XRD data of ME graphene and TE graphene are shown in FIG. 9. Normalized XRD data for graphite, IGBS, and commercial graphene are also shown in the same figure for comparison. All graphs are normalized to the main intensity peak. All samples exhibit a strong diffraction peak at around 2θ=26.5°, which is the characteristic of the (002) reflection of graphite that originates from the interlayer distance between sheets. All samples also show secondary low intensity peak at around 2θ=54.5°, which is corresponding to (004) plane. Inset of FIG. 9 shows magnified region for the main peak. Graphite shows narrow peak (with full width at half maximum FWHM=) 0.19° center at around 2θ=26.5°; IGBS shows broad peak (FWHM=) 0.96° center at around 26.5°; TE graphene shows broad peak (FWHM=) 0.65° center at around 26.9°; ME graphene shows broad peak) (FWHM=0.49° center at around 26.8°; and commercial graphene shows broad peak)(FWHM=0.57° center at around 26.8°. The broad peak in IGBS suggests merge of pure graphitic peak at higher angle and sulfur intercalated graphitic phase related peak at lower angle. ME graphene and TE graphene shows similar nature of (002) peak to that of commercial graphene which is symmetric and broad than graphite. Moreover, sulfur intercalated graphitic phase is absent in the samples indicating removal of intercalated sulfur by thermal shock and microwave shock.

Figure 10:
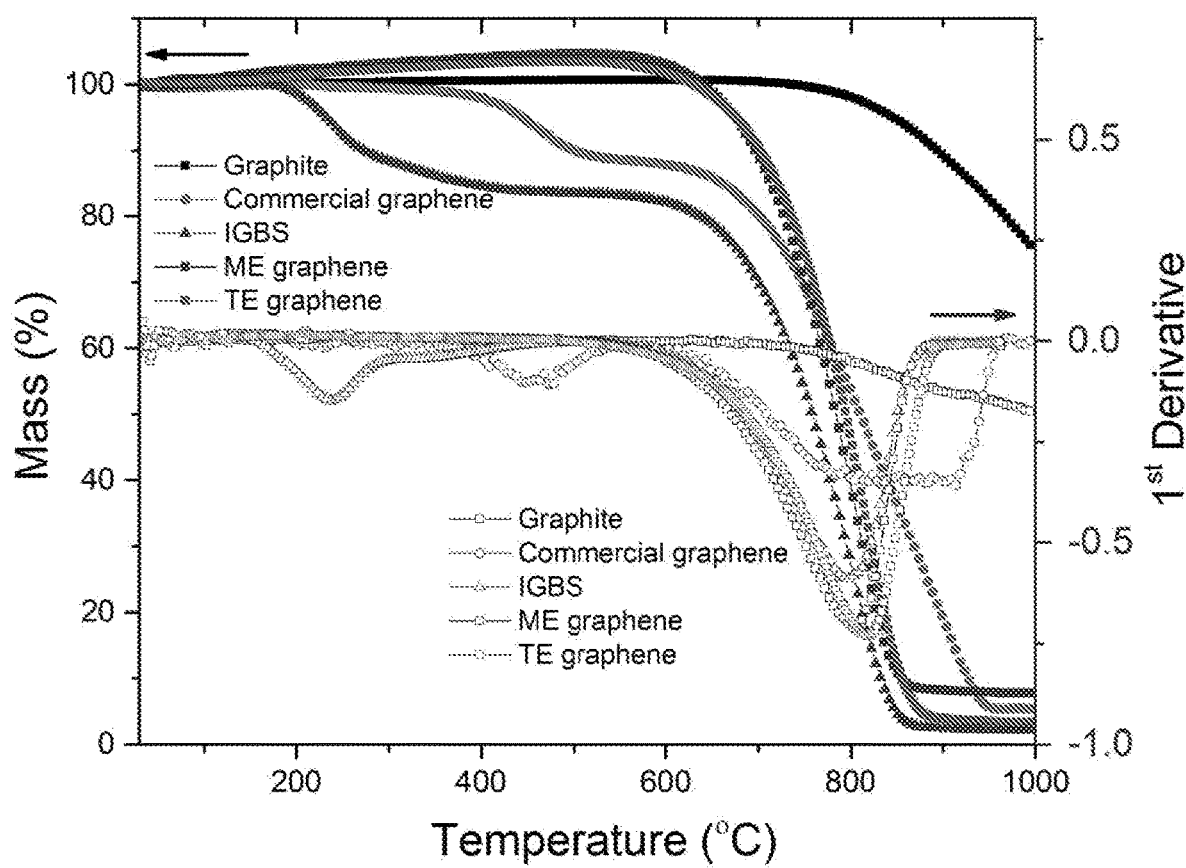
FIG. 10 shows TGA and first derivative spectra of graphite, commercial graphene, IGBS, ME graphene, and TE graphene.

TGA and first derivative TGA spectra (DTA) data are shown in FIG. 10. As mentioned in the experimental, samples were heated from 25 to 1000° C. at the heating rate 10° C. per minute in dry air atmosphere (around 21% oxygen) with flow rate of 25 sccm. Graphite does not completely oxidize up to 1000° C. leaving behind 75.58 wt % mass. The DTA profile for graphite shows oxidation and rapid mass loss above 720° C. Compared to graphite, IGBS shows two downshifts in the TGA profile leaving behind 2.2 wt % mass at 1000° C. The leftover mass could be assign to the un-oxidized graphite, ash and impurities such as Si intercalant. The first downshift starts at around 130° C. losing mass around 15 wt % up to 500° C. The lost mass could be assign to the S intercalant. The corresponding DTA inflection temperature is 238° C. The second inflection is at around 800° C. which could be assigned to the oxidation of graphitic carbon. The TGA profiles of ME graphene and TE graphene show a small increase in the mass at up to the 600° C. This was repeated for the samples for several times, but it shows similar trend. It is speculated that the puffy graphene might be adsorbing gases resulting in a small increase in the mass. High surface area of graphene readily adsorbs various gases and functional groups. Furthermore, it also confirms that ME graphene and TE graphene does not contain any residual S. The left over mass at 1000° C. is around 7.75 wt % and 3.45 wt % for ME graphene and TE graphene respectively. The lower residual mass in TE graphene compare to ME graphene could be related to the higher degree of exfoliation in TE graphene as observed in SEM. The oxidized blurred edges (as observed in TEM) in TE graphene might have also acted as the starting ignition source during TGA consuming more graphene than ME graphene. Compare to IGBS the higher leftover mass observed for ME graphene and TE graphene could assign to the thermally stable high crystalline graphene with the low oxygen content. The DTA profile shows single peak at 810° C. for ME graphene and 820° C. for TE graphene. The higher inflection temperatures also indicate the high crystallinity of ME graphene and TE graphene. Low crystalline samples are prone to thermal oxidation as the defected sites on graphene basal plane acts as the multiple ignition starting points. TGA profile of commercial graphene is also shown for comparison. It shows two down shifts. The lost mass of around 10 wt % below 600° C. could be assigned to the amorphous carbon, whereas the residual mass of around 5.34 wt % left over at 1,000° C. could be assigned to the impurities and ash. DTA profile of commercial graphene shows a peak at 450° C. corresponding to the oxidation of amorphous carbon and a broad peak at 800° C. corresponding to the oxidation of graphene/graphite. As compared to (from DTA profile) commercial graphene, TE graphene and ME graphene consist of single phase material with better quality.

Figure 11:
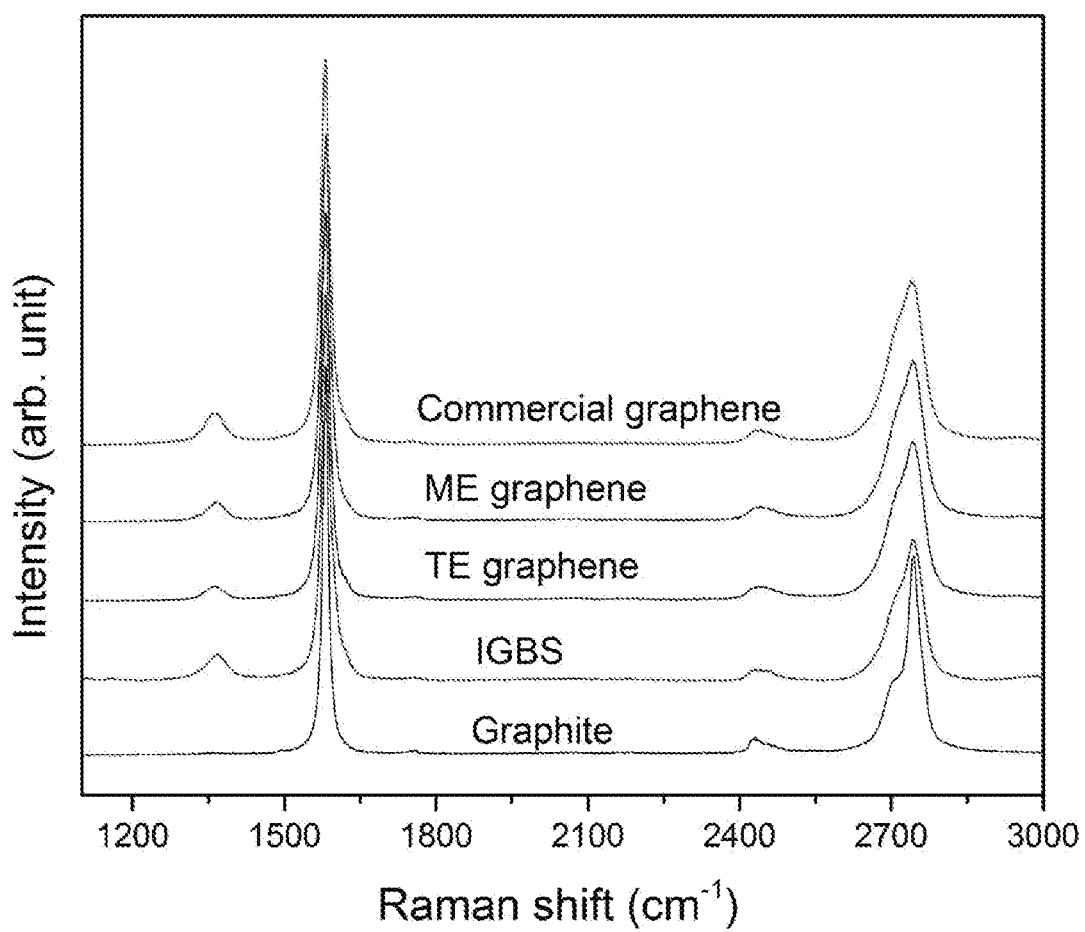
FIG. 11 shows Raman spectra of graphite, IGBS, TE graphene, ME graphene, and commercial graphene.

Normalized Raman spectra are shown in FIG. 11. The most prominent peaks in all the samples are characteristic strong G band at around 1580 cm$^{-1}$ which is attributed to the primary in-plane vibration of sp$^2$-bonded carbon atoms in the two-dimensional hexagonal lattice, and 2D band at around 2740 cm$^{-1}$ which is attributed to the second-order overtone of different in-plane vibration of D band. Apart from graphite, the remaining samples show a hump like feature with less intense D band at around 1368 cm$^{-1}$ which is originated from the graphitic edges or by imperfections. Intensity ratio of D and G band ($I_D/I_G$) is an important measure of the degree of structural defects in graphene and graphite. The IGBS show an $I_D/I_G$ ratio of 0.07 which is higher than ME graphene (0.6) and TE graphene (0.4). The lowered $I_D/I_G$ ratio in ME graphene and TE graphene could be assign to the restoration of sp$^2$-hybridized carbon resulting from the healing due to microwave/thermal energy during microwave/thermal shock. The high crystallinity of ME graphene and TE graphene noted in TEM imply that the observed D band is solely due to the structural imperfections at the edges and not from the basal plane. The commercial graphene shows an $I_D/I_G$ ratio of 0.9 implying higher quality of ME graphene and TE graphene. The nature of 2D band could give insight of number of layers in graphene samples. Graphite and IGBS clearly shows asymmetric 2D band while ME graphene, TE graphene, and commercial graphene show reasonably symmetric 2D peak indicating that the samples are dominated by few layer graphene. Compared to chemical vapor deposition deposited graphene, exfoliated graphene from graphite shows less intense 2D peak than G peak.

In sum, the data from Examples 1 and 2 show the synthesis of "few layer graphene" (FLG) from graphite bisulfate at least the following:

Thermal and microwave shock gives rapid expansion of adjacent graphitic layers.

Graphite bisulfate shows the interlayer spacing of 0.359 nm which is greater than the graphitic interlayer spacing 0.341.

ME and TE graphene show few layer graphene (FLG) formation.

The interlayer spacing in ME and TE graphene is 0.341 nm indicating the escape of sulfur.

The ME and TE graphene show high crystallinity (SAD) and low carbon to oxygen ratio (EDX).

HAADF images show the extent of few layer graphene within the single flake.

IGBS, ME graphene, and TE graphene samples were compared with the commercial graphene and graphite for XRD, TGA, and Raman analyses.

XRD analysis shows variation in peak position and FWHM of (002) peak.

TGA analysis shows the graphene samples are stable below 800° C.

Raman spectra show symmetric nature of 2D peak for graphene samples as compared to symmetric peak in graphite.

The process described herein provides for a mass production approach to provide high quality graphene in a simple, one step, reliable, repeatable, ecofriendly, and economic process.

Example 3: Blender, Tip-Sonication, Surfactant, and/or Freeze Drying Experiments Exfoliation Using Blender:

A 1500 W blender (Local brand ALSAIF-ELEC, model Hummer 1500 W) with electronically adjustable speed was used for the turbulence assisted shear exfoliation and surfactant assisted dispersion. The blender had a 2 liter capacity glass jar with two up-ward and two down-ward stainless steel blades. Either 500 mg TE graphene or ME graphene samples were weighted using analytical balance and put in a jar. 500 ml DIW was poured into the jar. In general observation, graphene sample floats onto the water and need further stirring using spoon to form a mixture for further processing. The mixture was blended for 60 min using one of the automatic function knobs available with the blender, which operates the blender at full power with the on/off cycle of 1.1 s.

After blending the graphene slurry was precipitated on the water, which was separated by spoon. The graphene settled at the bottom of water was separated by centrifugation at 4000 RPM. The separated graphene and graphene slurry was freeze dried to form free-flowing graphene powder. The freeze drying process consists of storage the samples at −70° C. for 24 hrs and vacuum drying for next 24 hrs using freeze dryer.

In concomitant experiment, 5 g of SDS was added to the TE graphene in water solution and further blended for 60 min in a similar way to achieve well disperse 1 mg/ml graphene aqueous.

Exfoliation Using Tip-Sonicator:

A tip-sonicator (Cole-Parmer 750-Watt Ultrasonic homogenizer @40% amplitude) was used for the turbulence assisted shear exfoliation and surfactant assisted dispersion. Either 500 mg TE graphene or ME graphene samples were weighted using analytical balance and put in a beaker 1 lit beaker. 500 ml DIW was poured into the beaker. In general observation, graphene sample floats onto the water and need further stirring using spoon to form a mixture for further processing. A tip-sonicator tip was emerged 2 cm into the water and the mixture was treated for 30 hrs using 3:2 s on/off ratio pulse.

After ultra-sonication treatment the graphene slurry was precipitated on the water, which was separated by spoon. The graphene settled at the bottom of water was separated by centrifugation at 4000 RPM.

The separated graphene and graphene slurry was freeze dried to form free-flowing graphene powder. The freeze drying process consists of storage the samples at −70° C. for 24 hrs and vacuum drying for next 24 hrs using freeze dryer.

In concomitant experiment, 5 g of SDS was added to the TE graphene/ME graphene in water solution and further treated for 30 hrs in a similar way to achieve well disperse 1 mg/ml graphene aqueous.

Additional experiments were carried out on the TE graphene and ME graphene materials.

First is turbulence assisted shear exfoliation using a blender; second is turbulence assisted shear exfoliation using a blender and surfactant; third is turbulence assisted shear exfoliation using tip-sonication; and fourth is turbulence assisted shear exfoliation using tip-sonication and surfactant.

These experiments provide a well dispersed graphene aqueous and graphene slurry. This can be subjected to centrifugation and freeze drying to provide a high surface area free-flowing graphene powder.

FIG. 11 shows the process steps to prepare graphene slurry, graphene aqueous, and graphene powder from TE graphene and ME graphene.

In Example 3A, turbulence assisted shear exfoliation using a blender is carried out with use of 500 mg TE graphene and 500 mL deionized water. The blender is a 1500 watt Hummer). The time of blending is 30-120 minutes (with 1:1 s on/off ratio). The floating graphene onto the water was collected using spoon and named as a graphene slurry. The graphene slurry was further freeze-dried to form free-flowing graphene powder. Similarly, the settled graphene was separated by centrifugation and dried using freeze dryer to form free-flowing graphene powder.

In Example 3B, turbulence assisted shear exfoliation using a blender is carried out as in Example 3A but now with an added surfactant, SDS (500 mg TE graphene, 5 g SDS, and 500 mL deionized water; blender is a 1500 watt Hummer). The time of blending is 30-120 minutes (with 1:1 s on/off ratio). The product is now a well-dispersed graphene solution named as graphene aqueous.

The difference in the product between Examples 3A and 3B is that in 3A it is graphene slurry and graphene powder, whereas in 3B it is well dispersed graphene aqueous.

In Example 3C, turbulence assisted shear exfoliation using tip sonication is carried out with use of 500 mg TE graphene and 500 mL deionized water (in a beaker). The tip sonicator power is 750 watt with on/off 3:2 seconds. The total time for sonication is 30 hours. The product is graphene slurry which floats onto the water or free-flowing graphene powder (after centrifugation and freeze drying).

In Example 3D, turbulence assisted shear exfoliation using a tip sonicator is carried out as in Example 3C but now with an added surfactant, SDS (500 mg TE graphene, 5 g SDS, and 500 mL deionized water. The time of sonication is 30 hours. The product is now a well-dispersed graphene in water named as graphene aqueous.

The difference in the product between Examples 3C and 3D is that 3C is graphene slurry or graphene powder, whereas 3D is well dispersed graphene aqueous.

Figure 12:
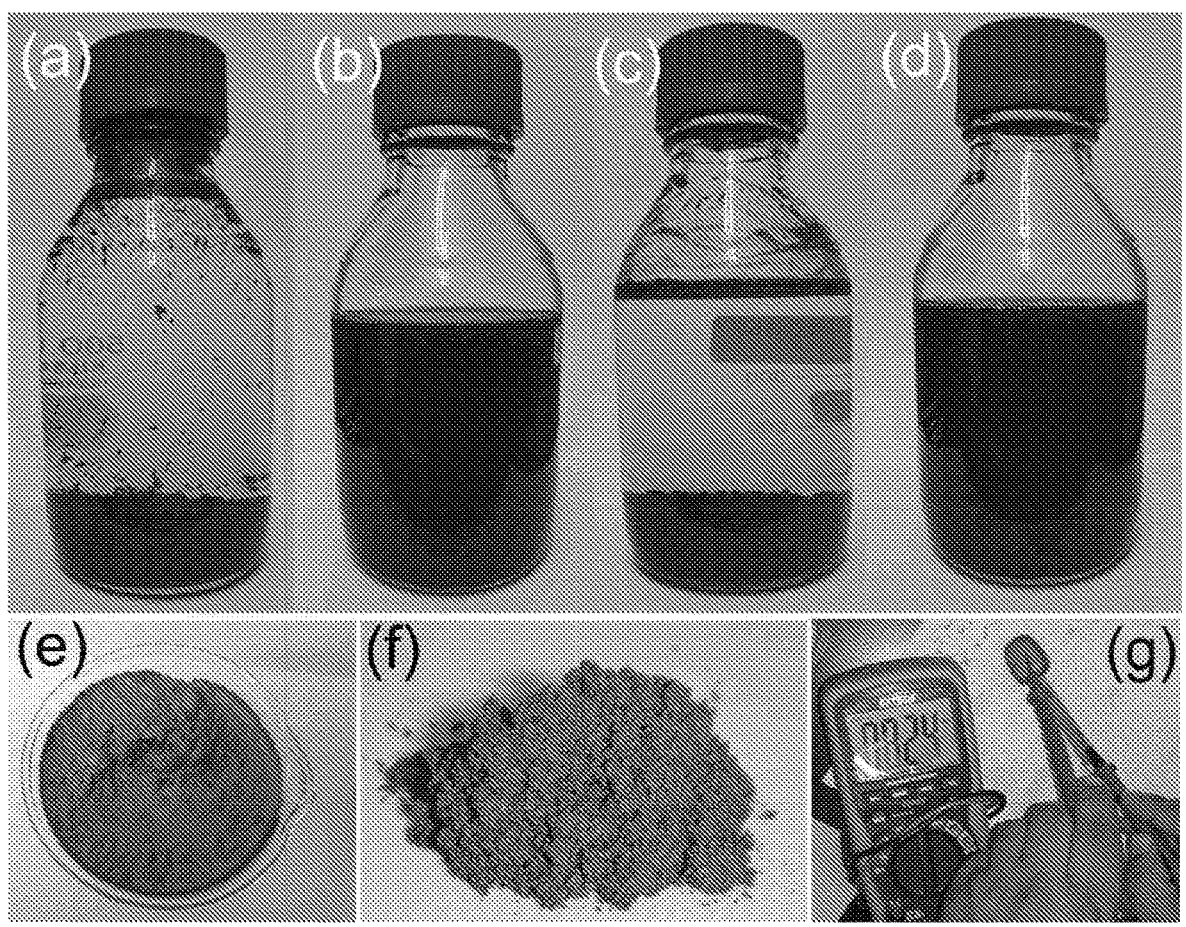
FIG. 12 (a-g): (a-d) the graphene aqueous mixture after the turbulence-assisted shear exfoliation of TE graphene: after processing with (a) blender, (b) blender with surfactant, (c) sonication, and (d) sonication with surfactant. Photographs showing (e) graphene slurry, (f) graphene powder, and (g) conductive graphene coated polystyrene (PS) spoon.

FIG. 12 shows the photographs of graphene aqueous after the turbulence assisted shear exfoliation of TE graphene: after processing with (A) blender, (B) blender with surfactant, (C) sonication and (D) sonication with surfactant. Photographs showing (E) graphene slurry, (F) graphene powder, and (G) conductive graphene coated PS spoon.

For the example of a conducting polystyrene spoon shown in FIG. 12(G), a non-conducting polystyrene spoon was immersed into the graphene solution. A Langmuir-Blodgett conducting film of graphene was coated onto the spoon. Testing with a two probe multi-meter showed 824Ω resistance.

The Example 3 shows, among other things, that:

Shear exfoliation using a blender gave graphene slurry which floats on deionized water.

SDS helped to achieve the well-dispersed graphene solution.

Shear exfoliation using a blender is more effective than tip-sonication.

Freeze drying gives graphene powder.

Though the SDS improves the dispersion, it also add residue in the sample.

Freeze drying is useful to dry the samples without forming agglomerates and without loosing the surface area.

Blender exfoliation with SDS is more effective than tip-sonication to obtain the well-dispersed graphene aqueous solution in shorter processing times.

Blender and tip sonication followed by centrifugation and freeze drying is well suited to obtain the graphene powder.

With further changes to the blender-time/tip-sonication time and SDS amount a well dispersed graphene aqueous solution can be obtained.

Example 4

In an embodiment of the application of the product described and/or claimed herein for electrodes of batteries, the superior performance of exfoliated graphene versus graphite flakes for use in Al-ion batteries was demonstrated. This shows that the graphene platelets may be used in the energy Industry.

Methods and Materials:

Materials:

Either graphite powder (Sigma Aldrich, 45 µm) or expanded-exfoliated graphene (as described herein, TE graphene after blending and freezer drying) powder were used as the cathode material for an Al-ion rechargeable battery system.

Preparation of Electrodes:

The slurry that contained the active material was made by mixing of 80 wt % of active material (i.e., graphite or TE-graphene), 10 wt % of PVDF (polyvinylidene fluoride) as the binder, 10 wt % of carbon black as the conductive agent, and a suitable amount of NMP (n-methyl pyrrolidone) as the solvent. Initially, the mixture was well-grinded with NMP and then stirred for 24 hours. The prepared slurry was then coated over a piece of carbon paper using a doctor-blade technique. The uniformly coated electrode underwent a heat treatment at 100° C., in a vacuum furnace, for 12 hours.

Preparation of Ionic Liquid Electrolytes:

A room temperature ionic liquid electrolyte was made by mixing 1-ethyl-3-methylimidazolium chloride ([EMIm]Cl, 97%, Sigma Aldrich) and anhydrous aluminum chloride ($AlCl_3$, 99.999%, Sigma Aldrich) at a molar ratio of 1.3:1. A pale yellow colored ionic liquid was obtained while mixing the above chemicals.

Electrochemical Measurements:

All electrochemical measurements were done in a half-cell configuration with a Swagelok cell. In this, Al foil (Sigma Aldrich, 125 µm thickness, 99.998%) served as the anode; carbon paper coated with graphite (or TE-graphene) worked as the cathode, and the electrolyte was the mixture of $AlCl_3$ in [EMIm]Cl with 1.3:1 molar ratio.

As shown in FIGS. 13a-d, charge-discharge cycles were performed at various current densities ranging from 100 µA (70 mA/g) to 1000 µA (714 mA/g) and finally brought back to 100 µA in order to verify the retention of initial capacity at the same current rate. The electrodes were charged and discharged for 10 cycles at each current density.

Figure 13:
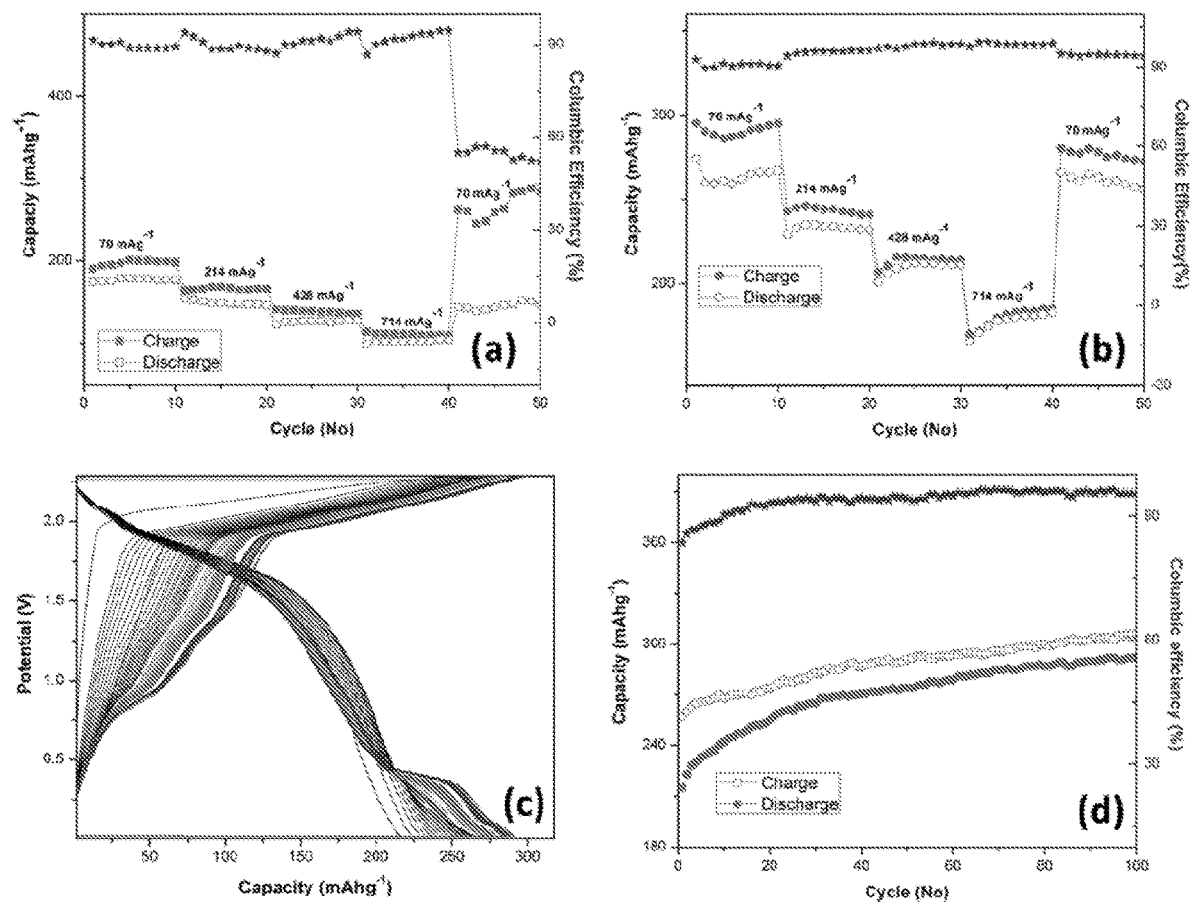
FIG. 13 (a-d): Current rate performance of (a) graphite, and (b) TE-graphene at various current densities. (c) Cyclic performance and (d) columbic efficiency of graphene at a current density of 300 μA.

The overall rate performance and columbic efficiency (CE) of the TE-graphene electrode was better than that of the graphite electrode. FIG. 13c shows the galvanostatic charge-discharge profile of the TE-graphene electrode for 100 cycles. A columbic efficiency of 98% was obtained for the graphene electrode after the 100 cycles of charge-discharge at the current density of 300 µA.

In conclusion, the TE-graphene provided an enhanced performance and stability for electrodes of Al-ion battery. While not limited by theory, possibly the superior electrochemical performance of the TE-graphene material was due to the larger surface-to-volume ratio when compared to the graphite material.

What is claimed is:

1. A method comprising:
subjecting at least one graphite intercalation compound to expansion conditions to produce graphene, wherein the expansion conditions include a thermal shock treatment without previous or parallel exposure to chemicals; and
subjecting the graphene to turbulence-assisted exfoliation to obtain a high quality graphene reaction product,
wherein a particle size of the graphite intercalation compound and an expansion time of the expansion conditions are adapted to provide the high quality graphene reaction product in which an average expansion in a reaction product is at least 10,000, and
wherein the high quality graphene reaction product is characterized by (1) a Raman D/G band ratio of 0.04, (2) an oxygen to carbon ratio of 0.06, and (3) a six fold symmetric electron diffraction pattern.

2. The method of claim 1, wherein the graphite intercalation compound is in the form of flakes, and the flakes of the graphite intercalation compound are characterized by an average extension along a basal plane of a distance of at least 50 microns.

3. The method of claim 1, wherein the graphite intercalation compound is expandable graphite.

4. The method of claim 1, wherein the graphite intercalation compound is a graphite salt.

5. The method of claim 1, wherein the graphite intercalation compound is intumescent graphite bisulfate.

6. The method of claim 1, wherein the graphite intercalation compound has a percent carbon of at least 85%.

7. The method of claim 1, wherein the graphite intercalation compound has sulfur as an intercalated element of highest atomic percent.

8. The method of claim 1, wherein the graphite intercalation compound has an interlayer spacing larger than a graphitic interlayer spacing of 0.341.

9. The method of claim 1, wherein the expansion conditions include vaporization of intercalated species.

10. The method of claim 1, wherein the expansion conditions include electromagnetic waves.

11. The method of claim 1, wherein the expansion conditions include application of heat, which is applied without microwaves.

12. The method of claim 1, wherein the time of subjecting the graphite to the expansion conditions is less than 80 seconds.

13. The method of claim 1, wherein the graphene is in a form having ten or fewer graphene layers.

14. The method of claim 1, wherein the graphene is subjected to sonication and/or mechanical shear.

15. The method of claim 1, wherein the graphene is dispersed in a solvent.

16. A composition prepared by the method of claim 1.

17. An ink composition prepared by the method of claim 1 and comprising at least one solvent vehicle.

18. An energy storage system comprising the composition of claim 16.

19. A method comprising:
subjecting at least one graphite intercalation compound to expansion conditions to produce graphene, wherein the expansion conditions include a thermal shock treatment without previous or parallel exposure to chemicals; and
subjecting the graphene to turbulence-assisted exfoliation to obtain a high quality graphene reaction product,
wherein a particle size of the graphite intercalation compound and an expansion time of the expansion conditions are adapted to provide the high quality graphene reaction product in which an average separation distance between two adjacent graphene sheets in the reaction product is at least 5 microns, and wherein the high quality graphene reaction product is characterized by (1) a Raman D/G band ratio of 0.04, (2) an oxygen to carbon ratio of 0.06, and (3) a six fold symmetric electron diffraction pattern.

* * * * *